US006746163B1

(12) United States Patent
Piccinino, Jr. et al.

(10) Patent No.: US 6,746,163 B1
(45) Date of Patent: Jun. 8, 2004

(54) SLACK LOOP DRYER FOR DRYING PHOTOGRAPHIC MATERIAL

(75) Inventors: Ralph L. Piccinino, Jr., Rush, NY (US); Daniel M. Pagano, Honeoye Falls, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/421,429

(22) Filed: Apr. 23, 2003

(51) Int. Cl.[7] .................................................. G03B 7/00

(52) U.S. Cl. ...................... 396/572; 396/579; 396/612; 34/419; 34/561

(58) Field of Search ................................ 396/572, 579, 396/612, 615, 620; 355/27–30, 77; 134/64 P, 64 R; 226/117, 118.2; 34/419, 445, 447, 561

(56) References Cited

U.S. PATENT DOCUMENTS 3,613,978 A * 10/1971 Renold ....................... 226/117
4,215,827 A * 8/1980 Roberts et al. .......... 242/364.3
4,999,667 A * 3/1991 Fukushima .................. 355/28
5,212,512 A * 5/1993 Shiota ........................ 396/612
5,235,369 A * 8/1993 Nakamura et al. .......... 396/569
5,559,575 A * 9/1996 King .......................... 396/618
5,802,416 A 9/1998 Earle et al. ................. 396/626
5,835,812 A 11/1998 Earle et al. ................. 396/636
5,903,794 A 5/1999 Sheley et al. ............... 396/612
6,052,144 A 4/2000 Reyner ....................... 347/262

* cited by examiner

*Primary Examiner*—D. Rutledge
(74) *Attorney, Agent, or Firm*—David A. Novais

(57) ABSTRACT

A photographic processor and a dryer for drying photographic material. The dryer comprises a path through which the photographic material extends wherein at least one slack loop is provided in the photographic material. An adjustable roller is provided along the path to adjust a size of the slack loop and an air supply arrangement is adapted to provide drying air to the slack loop. The air supply arrangement supplies air to a frame member that has slots along at least one wall. A sliding member is provided within the frame member to open and close the slots in accordance with the size of the slack loop. This enables a supply of drying air directly on the media and further permits the automatic adjustment of the amount of air being supplied in accordance with the size of the slack loop or the length of the media being dried.

20 Claims, 23 Drawing Sheets

306
71
70
206
54
52
44
42
204
34
202
32
302
200

26c
26b
26a
306
34
302
200
202
204
206

SLACK LOOP DRYER FOR DRYING PHOTOGRAPHIC MATERIAL

CROSS REFERENCE TO RELATED APPLICATIONS

The present application is related to the following pending patent application: U.S. patent application Ser. No. 10/421,395 filed Apr. 23, 2003, entitled A TRANSFER ASSEMBLY AND A DRYER OPERATIONALLY ASSOCIATED WITH THE TRANSFER ASSEMBLY.

FIELD OF THE INVENTION

The present invention relates to a slack loop dryer which is adapted to dry photographic material while the photographic material is moving therein. The present invention also relates to a photographic processor which includes the slack loop dryer.

BACKGROUND OF THE INVENTION

In typical photographic processing machines, photographic material, such as film, is processed by associating the photographic material with processing solution. After processing, the photographic material is dried in a dryer which typically blows air, such as heated air, onto the photographic material. Typically during processing, a single roll at a time is processed or a plurality of rolls of photographic film are spliced together and processed in a photograph processor. After processing, the processed photographic material is delivered to a dryer. Conventionally, the dryer includes a straight path therethrough, which does not permit an entire roll of photographic film to be removed from the processor and inserted into the dryer since the length of the path is usually less than the length of the photographic material to be dried. This can delay the start of the processing operation in the processor for a subsequent roll of film. Conventional dryers which include a U-shaped drying path enable the formation of a slack loop of the photographic material within the dryer. These conventional dryers permit the drying of longer length film but do not permit an adjustment of the length or the size of the slack loop to accommodate different lengths of film. Therefore, in these conventional dryers, it is not possible to match the amount of drying air applied to the film with the length or size of the slack loops of the photographic material being dried. It is, therefore, not possible to optimize the amount of air being supplied in accordance with the size of the slack loop.

SUMMARY OF THE INVENTION

The present invention relates to a dryer and a photographic processor which includes the dryer, wherein the dryer is capable of drying photographic material while it is moving. The dryer of the present invention is a slack loop dryer in which the size of the slack loops as well as the amount of drying air supplied to the slack loops are adjustable so as to optimize the supply of drying air onto the photographic material. With the arrangement of the present invention, it is possible to quickly remove processed photographic material from the processor in order to improve throughput. By continuously moving the photographic material during drying, the occurrence of drying marks and other drying artifacts on the photographic material is prevented.

The present invention also provides for a dryer which includes a telescoping mechanism or member that adjusts the drying air output. The telescoping member of the present invention permits the supply of the proper amount of air for drying the media by directing the air onto the media. The telescoping member is further adjustable based on the length of the media being processed.

The present invention accordingly relates to a dryer for photographic material which comprises a path for photographic material that extends from an entrance to an exit of the dryer, wherein at least one slack loop is provided in the photographic material; an adjustable roller provided along the path and at the slack loop in the photographic material, with a position of the adjustable roller being adjustable to change a size of the slack loop; a frame member having a wall which faces the slack loop, with the wall comprising a plurality of slots which are provided in a spaced manner along the wall; an air supply arrangement adapted to supply air into the frame member, with the air passing through the slots in a direction toward the slack loop of the photographic material; and a sliding telescoping member slidable within the frame member to open and close the slots, with the sliding telescoping member being movable based on the size of the slack loop as set by the adjustable roller, to open slots of the plurality of slots which oppose or face the slack loop and close slots which do not oppose or face the slack loop.

The present invention also relates to a dryer for photographic material which comprises a path for photographic material that extends from an entrance to an exit of the dryer; a first roller and a second roller provided along the path for transporting the photographic material to be dried along the path, with the second roller being provided downstream of the first roller with respect to a direction of travel of the photographic material along the path; a first adjustable roller provided in a first slack loop area along the path between the first roller and the second roller, such that the photographic material in the path passes around the first adjustable roller to form a first slack loop between the first and second rollers, with a position of the first adjustable roller being adjustable to change a size of the first slack loop; a frame member having a first wall which faces the first slack loop area, with the first wall comprising a plurality of first slots which are provided in a spaced manner along the first wall; an air supply arrangement adapted to supply air into the frame member, with the air passing through the first slots in a direction toward the first slack loop area to dry the photographic material; and a sliding member slidable within the frame member to open and close the first slots, wherein the sliding member is movable based on the size of the first slack loop as set by the first adjustable roller to open first slots of the plurality of first slots which face the first slack loop and close first slots which do not face the first slack loop.

The present invention also relates to a dryer for drying photographic material which comprises at least one first conveying roller for conveying photographic material from an entrance to the dryer to a first slack loop area; a first adjustable roller around which the photographic material passes to form a first slack loop of the photographic material, with the first adjustable roller being located in the first slack loop area and being adjustable to adjust a size of the first slack loop; a first set of slots located in an area below the least one first conveying roller for directing drying air in a direction toward a first side of the first slack loop; at least one second conveying roller downstream of said first adjustable roller with respect to the direction of travel of the photographic material, with the at least one second conveying roller conveying the photographic material to a second slack loop area; and a second set of slots located in an area below the at least one second conveying roller for directing drying air in a direction toward a second side of the first slack loop.

The present invention further relates to a dryer for drying photographic material which comprises conveying means for conveying the photographic material through the dryer, with the conveying means comprising means for forming at least one slack loop in the photographic material; first adjusting means for adjusting a size of the at least one slack loop in the photographic material; drying means for blowing drying air toward the at least one slack loop to dry the photographic material; and second adjusting means for adjusting an amount of drying air supplied by the drying means to substantially match the size of the slack loop.

The present invention further relates to a processing assembly which comprises a processor for processing photographic material; and a dryer for drying the processed photographic material. The dryer comprises a path for the photographic material which extends from an entrance to an exit of the dryer, wherein at least one slack loop is provided in the photographic material; an adjustable roller provided at the slack loop in the photographic material, with a position of the adjustable roller being adjustable to change a size of the slack loop; a frame member having a wall which faces the slack loop, with the wall comprising a plurality of slots which are provided in a spaced manner along the wall; an air supply arrangement adapted to supply air into the frame member, with the air passing through the slots in a direction toward the slack loop of the photographic material; and a sliding member slidable within the frame member to open and close the slots, wherein the sliding member is movable based on the size of the slack loop as set by the adjustable roller to open slots of the plurality of slots which oppose the slack loop and close slots which do not oppose the slack loop.

The present invention also relates to a method for drying photographic material, which comprises the steps of inserting photographic material into a drying path of a dryer in a manner in which at least one slack loop is provided in the photographic material; adjusting a size of the at least one slack loop in accordance with a length of the photographic material to be dried; providing an area of spaced slots in a manner in which the slots face the at least one slack loop; and supplying drying air through spaced slots in the area of space slots which oppose the at least one slack loop while blocking spaced slots in the area of spaced slots which do not oppose the at least one slack loop, such that a distance covered by the spaced slots through which drying air is supplied substantially corresponds to the size of the slack loop.

DETAILED DESCRIPTION OF THE INVENTION

Figure 1:
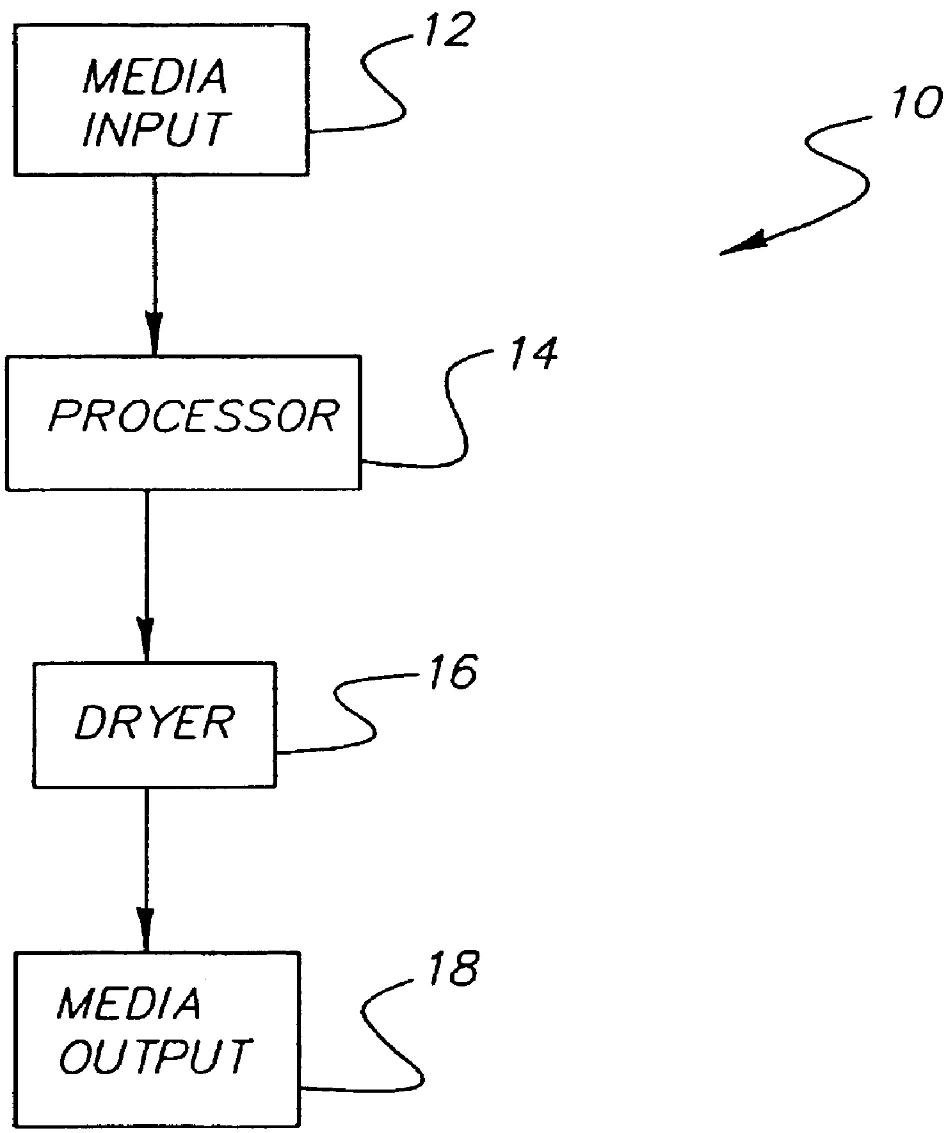
FIG. 1 is a schematic illustration of a photographic processing arrangement in accordance with the present invention including a processor and a dryer.

Referring now to the drawings, wherein like reference numerals represent identical or corresponding parts throughout the several views, FIG. 1 is a schematic illustration of a processing arrangement in accordance with the present invention. More specifically, FIG. 1 illustrates a processing arrangement 10 for processing photosensitive or photographic material such as photographic film. As shown in FIG. 1, processing arrangement 10 includes a processor 14 and a media input 12. Processing arrangement 10 also includes a dryer 16 associated with processor 14 as well as a media output 18. Processor 14 can be any one of the variety of known photographic processors which are adapted to process photographic material through the use of processing solutions such as developer, bleach, fix, etc.

The photographic material processed in processor 14 of the present invention is photographic film such as 35 mm film, APS film, 110 format film or 120 format film. The photographic material is typically processed in processor 14 by processing individual rolls or processing batches where a plurality of rolls are spliced together. As an example, and with respect to media input 12, the photographic material could be provided on a supply roll that is placed in a supply chamber associated with processor 14. The photographic material would be led in a known manner from the supply roll into processor 14. Processor 14 could be a well known processor that includes a plurality of processing stations or tanks wherein the photosensitive material is subject to different photographic processing solutions. For example, processor 14 could be of the type which subjects photographic material to a photographic developing solution, a photographic bleach/fix solution and rinse solutions.

After leaving processor 14, the photographic material is passed through dryer 16 where it is dried and then led out of arrangement 10 through media output 18.

Figure 2:
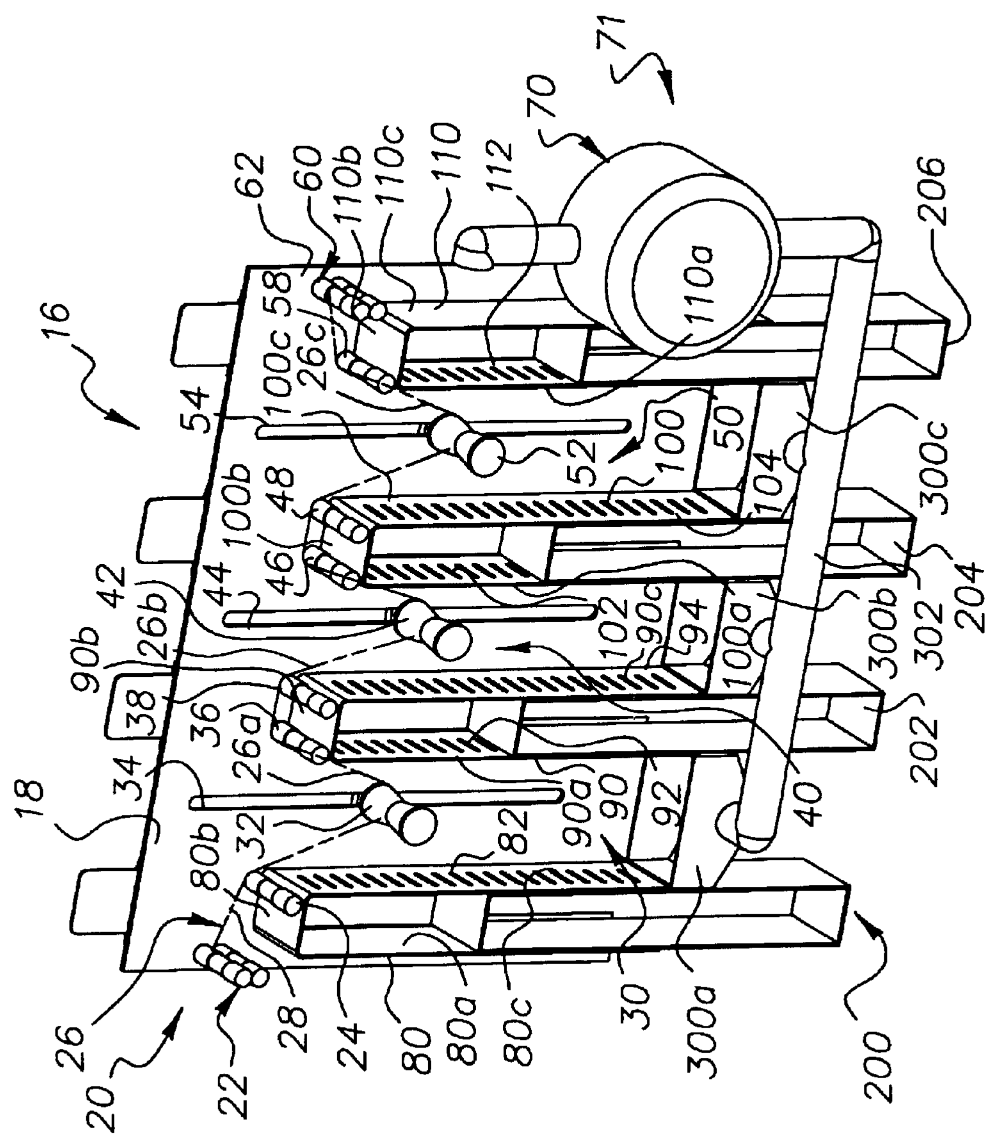
FIG. 2 is a view of an interior of a dryer in accordance with the present invention.

With reference to FIG. 2, the specifics of dryer 16 in accordance with the present invention is shown. As shown in FIG. 2, dryer 16 includes a supporting wall 18 on which can be mounted a plurality of conveying rollers. Dryer 16 includes an entrance 20 having a pair of entrance rollers 22. Rollers 22 are adapted to convey film 26, which is inserted into dryer 16 along film track 28 in dryer 16. Also positioned along film track 28 is conveying roller 24 which leads film 26 to a first slack loop area 30 provided within dryer 16. Positioned within first slack loop area 30 is a first adjustable roller 32 which is mounted so as to be vertically adjustable within a guide slot 34 provided in wall 18. Guide slot 34 defines a vertical path for movement of adjustable roller 32 therein within the space defined by guide slot 34. As film 26 conveyed along film path 28 passes around first adjustable roller 32, a first slack loop **26*a* is formed by film 26 within first slack loop area 30**.

Located downstream of conveying roller 24 with respect to the direction of movement of film 26 along film track 28 are additional conveying rollers 36 and 38. Conveying rollers 36 and 38 guide film from first slack loop area 30 to a second slack loop area 40. An adjustable roller 42 is provided within second slack loop area 40 and is rotatably mounted in a second guide slot 44 so as to permit the vertical adjustment of roller 42 along the length of second guide slot 44. Second guide slot 44 is located in wall 18. Film 26 passing within second slack loop area 40 passes around second adjustable roller 42 to form a second slack loop **26*b* within second slack loop area 40**.

Located downstream of conveying rollers 36 and 38 with respect to the direction of movement of film 26 are further conveying rollers 46 and 48 which convey film 26 from second slack loop area 40 to a third slack loop area 50. Positioned within third slack loop area 50 is a further adjustable roller 52. Further adjustable roller 52 is rotatably mounted within a guide slot 54 that is provided in wall 18 of dryer 16. Adjustable roller 52 is adapted to be vertically adjustable within the length defined by guide slot 54. Film 26 passing within third slack loop area 50 passes around adjustable roller 52 to form a third slack loop **26*c* with third slack loop area 50**.

Located downstream of conveying rollers 46 and 48 with respect to the direction of movement of film 26 is a further conveying roller 58 and an exit roller pair 60 which convey the film to an outlet 62 of dryer 16.

Dryer 16 further includes an air supply arrangement or member 71 that includes a blower/heater 70 which is adapted to supply air, preferably heated air, to dryer 16 in a manner which will be described. As shown in FIG. 2, dryer 16 includes a first frame member 80 which comprises a first wall **80*a*, a second wall 80*b* which is approximately located below conveying roller 24 and third wall 80*c*. Provided along third wall 80*c* are a plurality of slots or nozzles 82** which extend in a spaced manner along the vertical direction.

Dryer 16 further includes a second frame member 90 which includes a first wall **90*a*, a second wall 90*b* and a third wall 90*c*. As shown in FIG. 2, first wall 90*a* includes a plurality of slots or nozzles 92, while second wall 90*c* which opposes first wall 90*a* includes a plurality of slots or nozzles 94. Each of slots 92 and 94 extend in a spaced manner along the vertical direction as shown. Conveying rollers 36 and 38 are approximately located above wall 90*b*** as shown.

Dryer 16 further comprises a third frame member 100 which includes a first wall **100*a*, a second wall 100*b* and a third wall 100*c*. Third frame member 100 includes slots or nozzles 102 along first wall 100*a* and slots or nozzles 104 along second wall 100*c*. Each of slots 102 and 104 extend in a spaced manner along the vertical direction as shown, while conveying rollers 46 and 48 are approximately located above wall 100*b* of third frame member 100**.

Dryer 16 further includes a fourth frame member 110 which includes a first wall **110*a*, a second wall 110*b* and a third wall 110*c*. As shown in FIG. 2, first wall 110*a* includes a plurality of slots or nozzles 112 which are provided in a spaced manner along the vertical direction. Also, roller 58 is approximately located above wall member 110*b* of frame member 110**.

As shown in FIG. 2, frame member 80 includes a first telescoping sliding arrangement, mechanism or member 200 which is adapted to be slidable within first frame member 80 to selectively open and close some or all of slots 82 in accordance with the position of sliding member 200. More specifically, sliding member 200 is slidable within frame member 80 so as to open or block holes 82 in accordance with the position of sliding member 200. A second telescoping sliding arrangement, mechanism or member 202 is slidably provided within second frame member 90 for selectively blocking or opening slots 92 and 94; a third telescoping sliding arrangement, mechanism or member 204 is slidably positioned within third frame member 100 to selectively open or block slots 102 and 104; and a fourth telescoping sliding arrangement, mechanism or member 206 is slidably positioned within fourth frame member 110 to selectively open or block slots 112.

In FIG. 2, a portion of air supply arrangement 71 is deleted to facilitate the understanding of the structure of the frame members. As shown in FIG. 2, a first air return inlet **300*a* located at first slack loop area 30 leads to a return air pipe 302. This forms part of a recirculation system for returning air from first slack loop area 30 to blower/heater 70. Located at second slack loop area 40 is a second air return inlet 300*b* which re-circulates air from second slack loop area 40 to return air pipe 302 and directs it to blower/heater 70. Located at third slack loop area 50 is a third air return inlet 300*c* which leads air from third slack loop area 50 along air pipe 302 and back to blower/heater 70. As noted above, the air supply portion and more specifically, the tubes which supply air to each of frame members 80, 90, 100 and 110 are not shown in FIG. 2** for purposes of more clearly showing the structure of the frame members.

Figure 3:
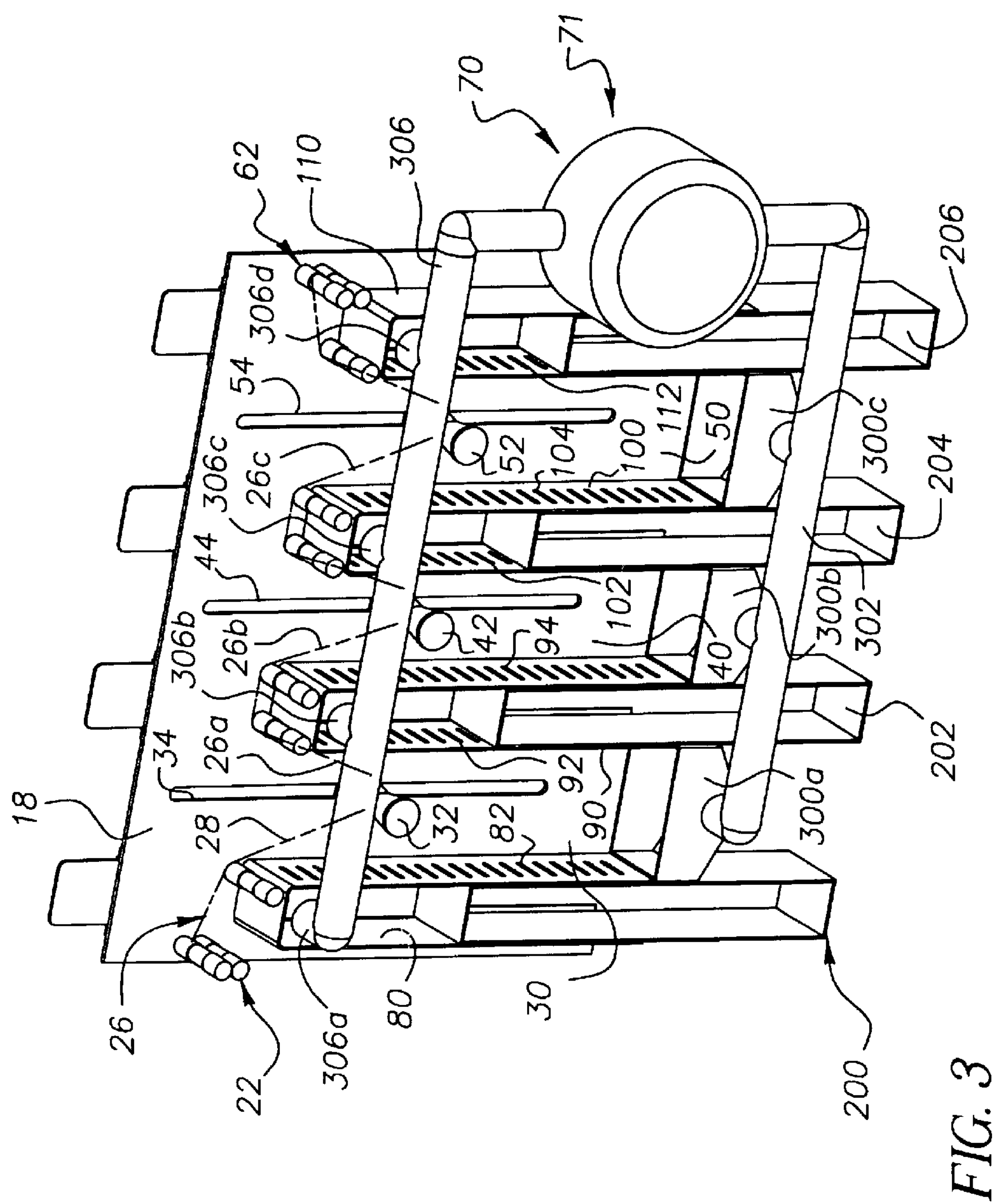
FIG. 3 is a further view of the dryer of FIG. 2.

FIG. 3 which is a view of dryer 16 with certain covers removed to facilitate the understanding of the invention illustrates features of the air supply arrangement of the present invention, and more specifically, shows an air supply tube 306 which directs air into each of frame members 80, 90, 100 and 110. Air tube 306 is connected to blower/heater 70 and includes a first opening **306*a* which opens to an area within frame member 80; a second opening 306*b* which opens to an area within frame member 90; a third opening 306*c* which opens to an area within frame member 100; and a fourth opening 306*d* which opens to an area within frame member 110**.

Therefore, with respect to FIG. 3, for the purposes of supplying drying air and preferably heated drying air to film 26 in dryer 16, air supply from blower/heater 70 is directed through tube 306 through each of outlets **306*a*, 306*b*, 306*c* and 306*d*. Air which is supplied through outlet 306*a* enters frame member 80 and travels through slots 82 so as to dry a first side of slack loop 26*a* of the photographic film within first slack loop area 30. Air which is supplied through opening 306*b* enters into frame member 90 so as to supply air through slots 92 so as to dry a second side of slack loop 26*a* within first slack loop area 30, and exits through slots 94 so as to dry a first side of slack loop 26*b* within slack loop area 40. The air which is supplied through opening 306*c* is directed through slots 102 so as to be directed to a second side of slack loop 26*b* formed by the film in second slack loop area 40 and slots 104 so as to be directed to a first side of slack loop 26*c* formed by the film in third slack loop area 50. Air which is supplied through opening 306*d* enters into frame member 110 so as to be directed through slots 112 in a direction toward a second side of slack loop 26*c* formed by the photographic film within third slack loop area 50**.

As also illustrated in FIG. 3, the air within first slack loop area 30 is adapted to by re-circulated to blower/heater 70 by way of air return inlet **300*a* and tube 302; the air in second slack loop area 40 is adapted to be re-circulated to blower/heater 70 by way of air return inlet 300*b* and air tube 302; and the air within third slack loop area 50 is adapted to be recirculated to blower/heater 70 by way of air return inlet 300*c* and air tube 302**.

Figure 4C:
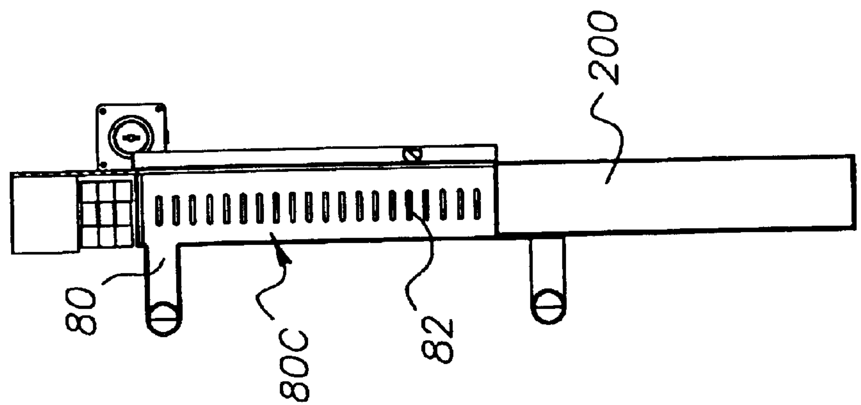
FIGS. 4A–4C are side views of the dryer of FIG. 2.
Figure 4B:
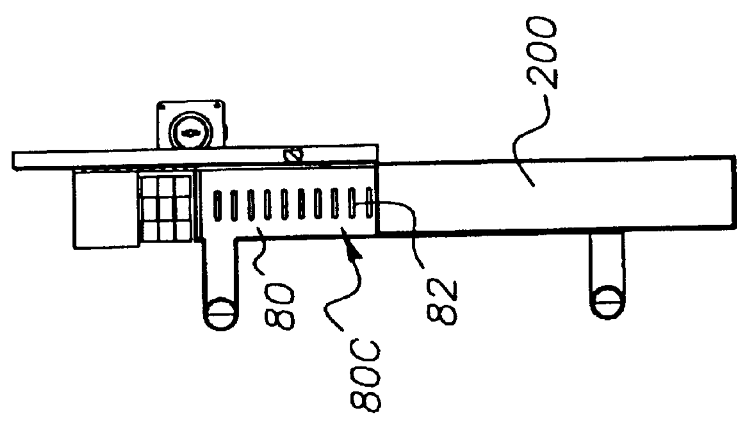
Figure 4A:
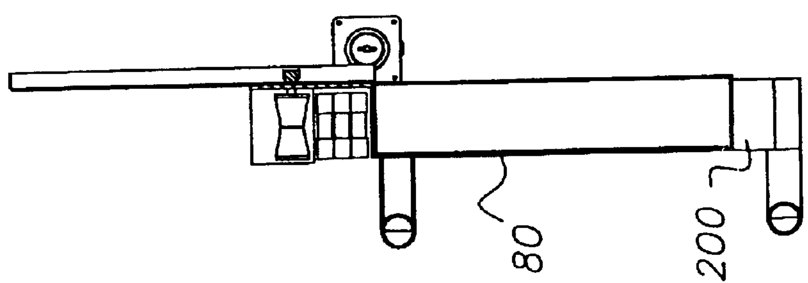

A feature of the present invention relates to the ability to adjust the amount of air being provided to each of the film slack loops **26*a*, 26*b*, 26*c* in accordance with the length of film and size of the slack loop formed by the film. In FIGS. 4A–4C, a side view of telescoping sliding member 200 while looking in the direction of nozzles 82 will be used as an example. Of course, it is realized that this description is applicable to the remaining telescoping members 202, 204 and 206, and the associated frame members. With reference to FIGS. 4A–4C, it is shown that sliding member 200 is movable to the position shown in FIG. 4A where all slots 82 are closed or blocked. FIG. 4B shows a second position for sliding member 200 where the chamber within frame member 80 is half open and more specifically, approximately half of nozzles 82 are open, and the remaining nozzles are closed or blocked by sliding member 200. This position is used when it is desired to dry photographic film where the slack loop extends approximately half way down the associated slack loop area. FIG. 4C illustrates an embodiment in which sliding member 200 is moved to a lower position in the chamber within frame member 80 to open all of nozzles 82. The position in FIG. 4C is used with longer length film in which the slack loop extends to the lower position within the slack loop area. Three positions are showing in FIGS. 4A–4**C for illustrative purposes. It is recognized that the present invention is not limited to the positions shown and that the sliding members are movable to various positions based on the size of the slack loops to substantially or approximately match the size of the slack loops.

Figure 5C:
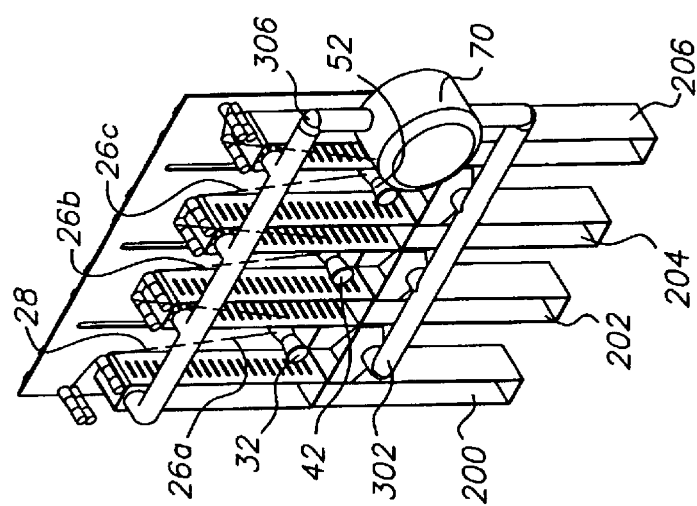
FIGS. 5A–5C are perspective views of the dryer in accordance with the present invention.
Figure 5B:
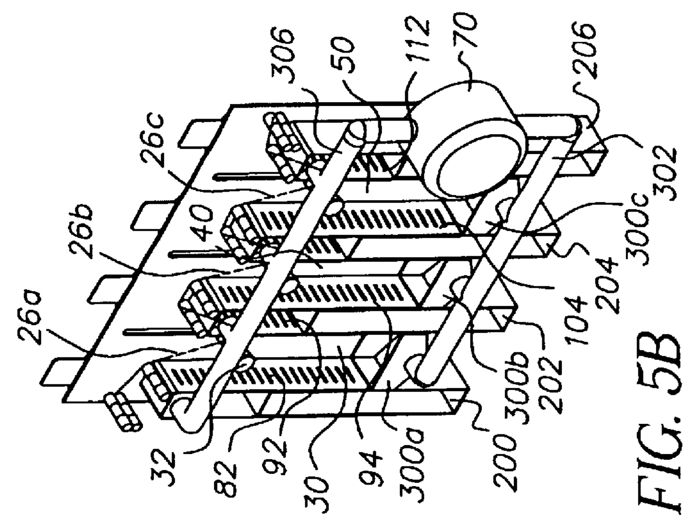
Figure 5A:
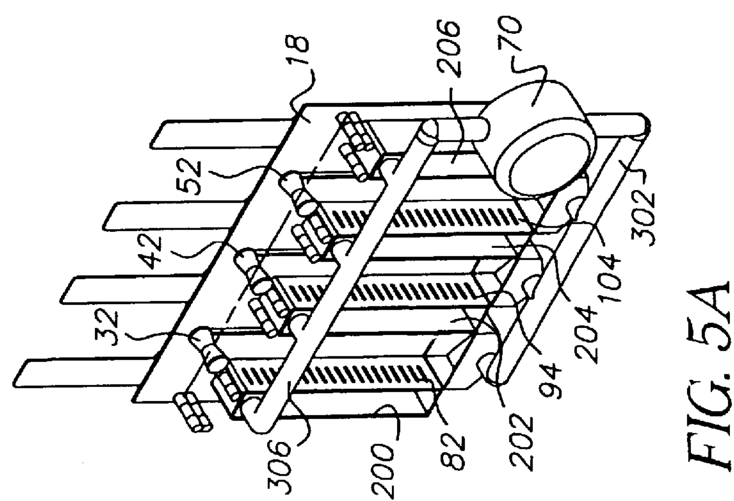
Figures 6A, 6B, 6C:
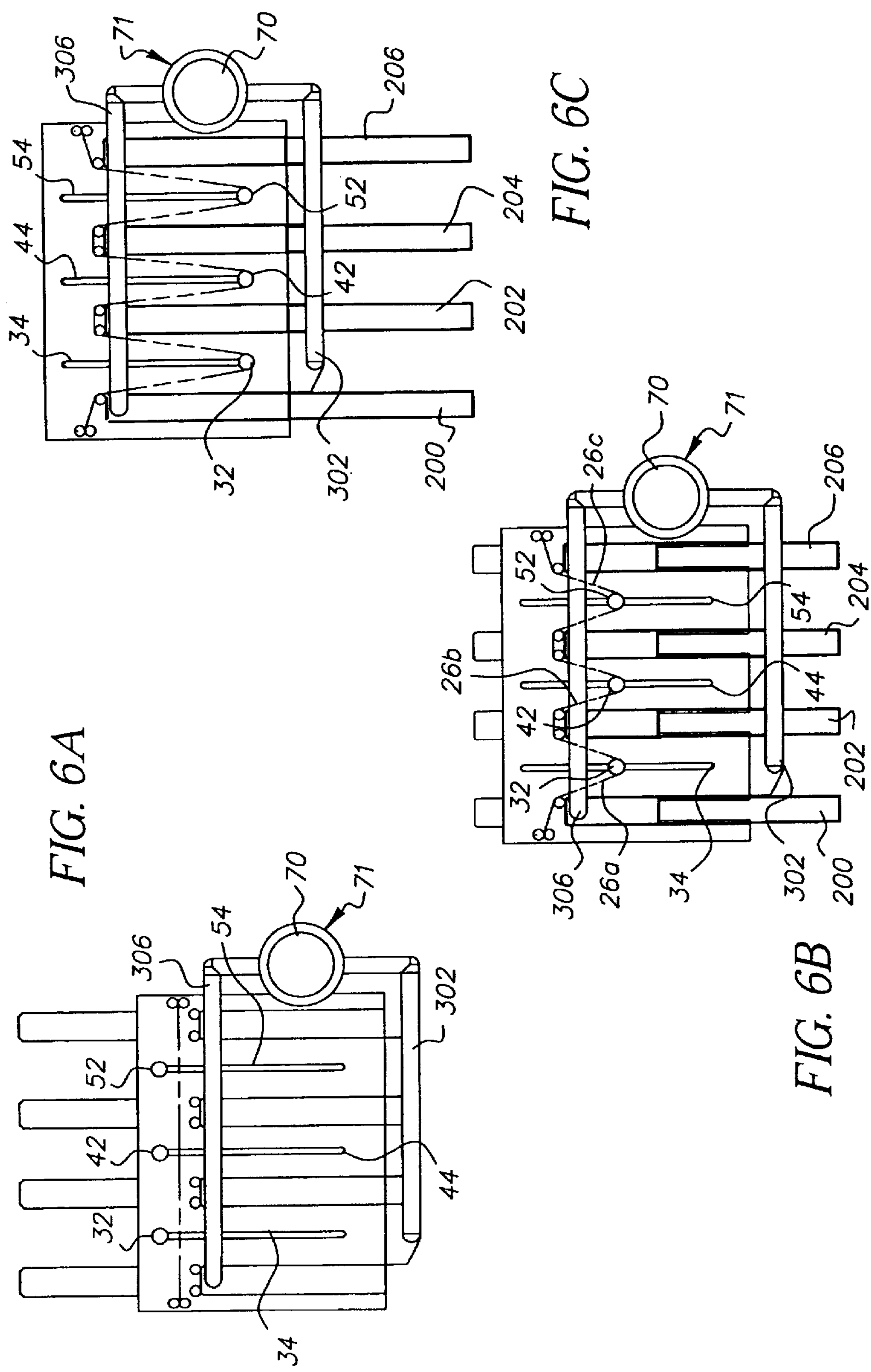
FIGS. 6A–6C are side views of the dryer shown in FIGS. 5A–5C.

FIGS. 5A–5C and 6A–6C illustrate different positions of sliding members 200, 202, 204 and 206 and adjustable rollers 32, 42 and 52 as described with reference to FIGS. 4A–4C. More specifically, in a closed position where no film is provided in dryer 16, sliding members 200, 202, 204 and 206 are positioned as shown in FIGS. 4A, 5A and 6A, where all of the associated slots are closed or blocked by the telescoping sliding members. If it is desired to dry media or film of a medium length, the telescoping sliding members are positioned as illustrated in FIGS. 4B, 5B and 6B to block or close some of the slots and leave the other or remaining slots open. More specifically, each of adjustable rollers 32, 42 and 52 are moved within associated guide slots 34, 44 and 54 to permit the creation of slack loops **26*a*, 26*b*, 26*c* having a first length as shown in, for example, FIG. 2, FIG. 5B and FIG. 6B. Since each of the slack loops formed do not take up the entire associated slack loop areas, it is not necessary for all slots 82, 92, 94, 102, 104 and 112 to be opened. Therefore, when slack loops having the first length shown in FIGS. 2, 5B and 6B are formed by adjustable rollers 32, 42 and 52, slidable members 200, 202, 204 and 206 are adjusted to the position illustrated in FIGS. 4B, 5B and 6B. In this position, approximately half (i.e. the upper half) of slots 82 and 92 which face slack loop 26*a* formed within slack loop area 30 will be opened; approximately half of slots 94 and 102 which face slack loop 26*b* formed in second slack loop area 40 will be opened; and approximately half of slots 104 and 112 which face slack loop 26*c* formed in third slack loop area 50 will be opened. The remaining slots, and more specifically, those slots located below the slack loop formed in each of the slack loop areas will be blocked by the respective sliding members 200, 202, 204 and 206**. This assures that air is supplied from only those slots which face or oppose the slack loops. Those slots which do not face or oppose the slack loops are closed or blocked by the sliding members.

When a longer length film is to be dried, then longer slack loops are necessary. That is, a slack loop having a length longer than the slack loop in FIGS. 5B and 6B is necessary. The longer length slack loop is illustrated in FIGS. 5C and 6C. To form the longer length slack loops, each of adjustable rollers 32, 42 and 52 are adjusted to a lower position within respective guide slots 34, 44 and 54 as shown in FIGS. 5C and 6C. Based on this, each of telescoping sliding members 200, 202, 204 and 206 can be moved to the position illustrated in FIGS. 4C, 5C and 6C. That is, each of sliding members 200, 202, 204 and 206 are moved so as to open all of slots 82, 92, 94, 102; 104 and 112. This permits a complete drying of the film within the slack loop areas since the area covered by the opened slots, or the amount of slots which are opened approximately match or correspond to the longer length slack loops formed by the adjustable rollers.

Therefore, with the arrangement of the present invention, when shorter length film which forms shorter slack loops are to be dried, it is possible to block slots or nozzles which do not face the slack loops or are located below the slack loop so as to avoid the supply of drying air to these areas. In addition, when longer length film which form longer slack loops are to be dried, the present invention permits the opening of additional slots to approximately match the size of the slack loop. That is, with the arrangement of the present invention, it is possible to customize or match the amount of slots or nozzles which are going to be utilized based on the length or size of the slack loops formed within the dryer.

The movement of the telescoping sliding members can be achieved through several methods. For example, each of the telescoping sliding members can be moved as a unit and can be manually moved between the positions discussed with reference to FIGS. 4A–4C, FIGS. 5A–5C and FIGS. 6A–6C; or the movement of the telescoping sliding members can be automated through the use of, for example, a motor and a drive gear.

Figure 7B:
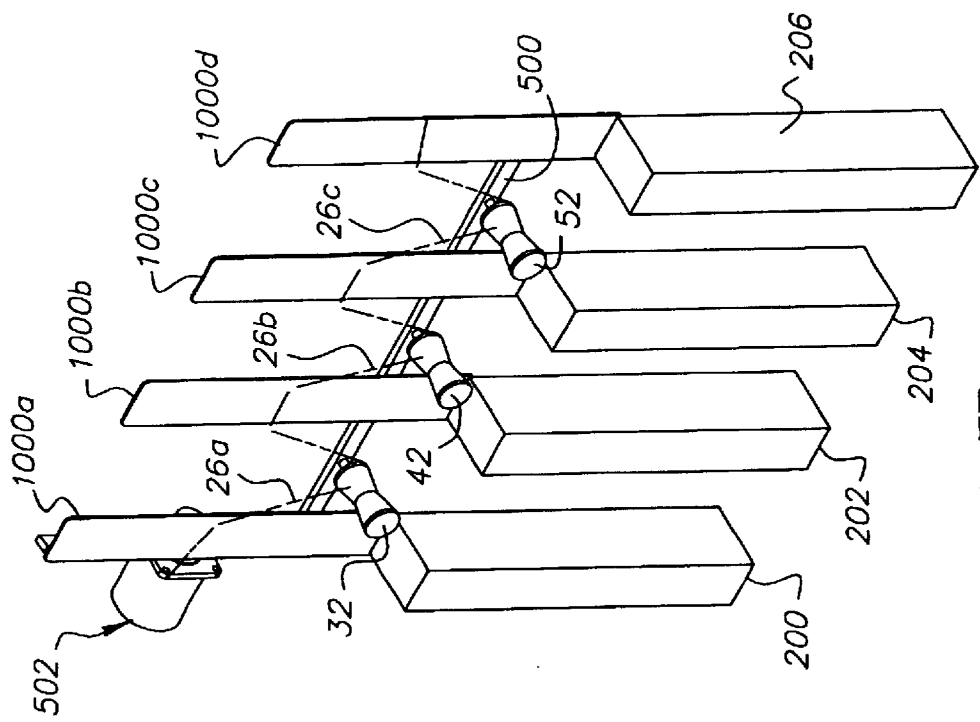
FIGS. 7A–7B are further views of the dryer in accordance with the present invention.
Figure 7A:
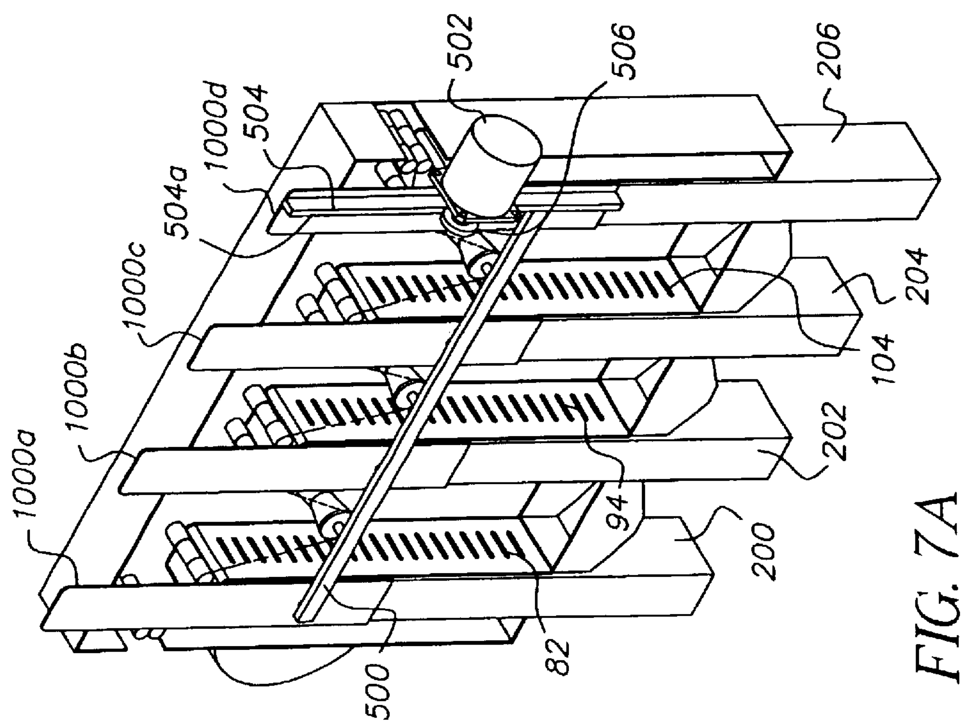

With respect to the movement of adjustable rollers, 32, 42 and 52 reference is made to FIGS. 7A and 7B which illustrate a rear view of dryer 16. As shown in FIG. 7A, each of adjustable rollers 32, 42 and 52 are rotatably mounted on a rod or bar 500. In the view of FIG. 7A, wall 18 has been removed to facilitate understanding of the movement of the adjustable rollers. Rod 500 onto which rollers 32, 42 and 52 are rotatably mounted, can be driven by way of a motor 502 which rotates a gear 506. Rod 500 is connected to a second rod or bar 504 which can include, for example, a rack gear

504*a* thereon. A rotation of motor 502 causes a rotation of a gear 506 which is in meshing engagement with rack gear 504*a*. This causes a vertical movement of rod 504 which causes a corresponding vertical movement of rod 500 in order to achieve the vertical movement of the adjustable rollers along the associated guide slots between the positions illustrated in FIGS. 5A–5C and 6A–6C. FIG. 7B illustrates an opposite view of the driving arrangement illustrated in FIG. 7A which shows the adjustable rollers mounted on the rod. As also shown in FIG. 7B, each of the telescoping sliding members are connected to a protruding plate member 1000*a*–1000*d* which move up and down in correspondence with the movement of the slidable telescoping sliding members. This provides for a visual indication of the position of the telescoping sliding members and can assist in gauging how far you desire to move the telescoping sliding members.

Figure 8:
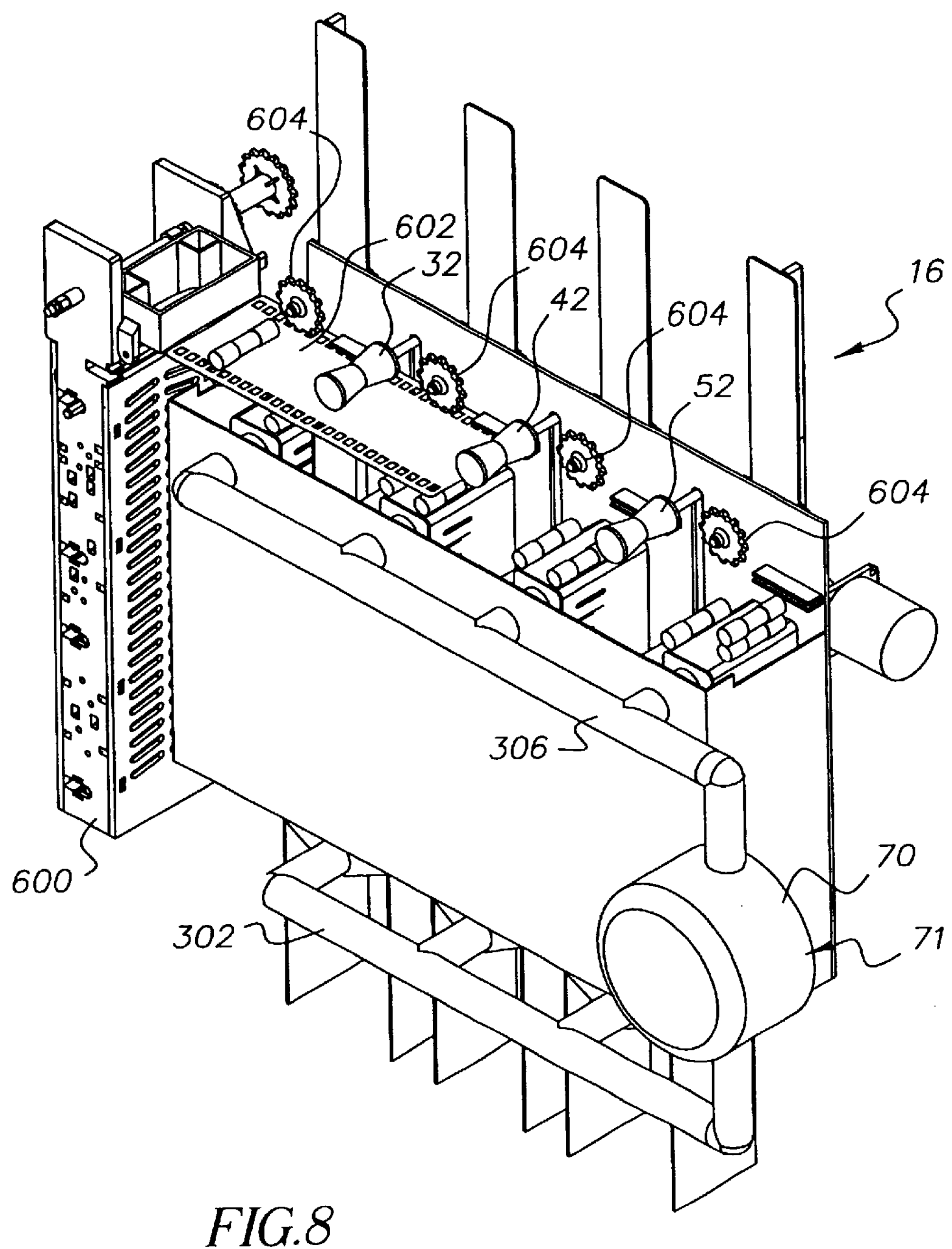
FIG. 8 illustrates the transfer of film and an attached leader card from a processor to the dryer in accordance with the present invention.
Figure 9:
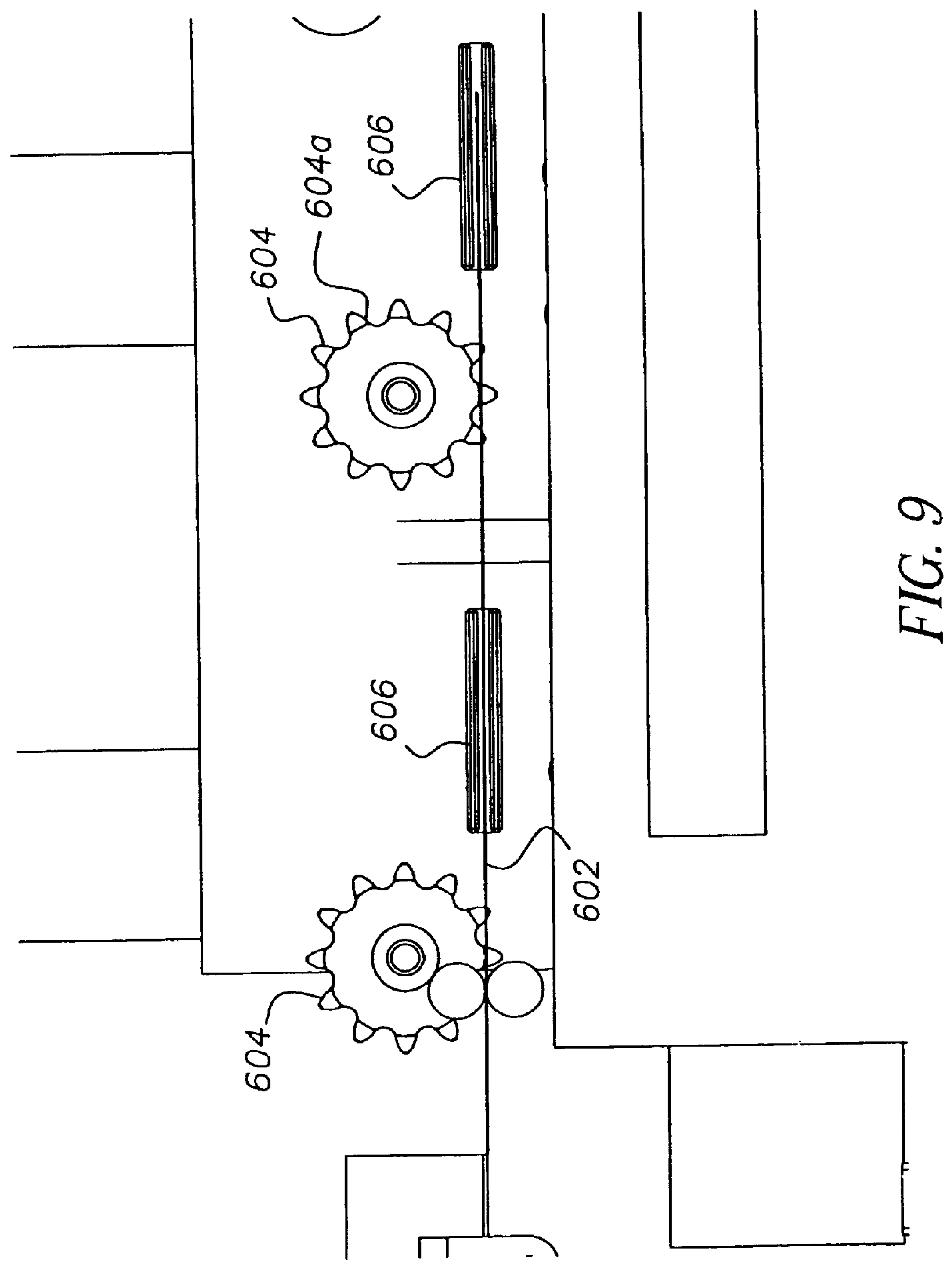
FIG. 9 shows sprockets for conveying the film and leader card of FIG. 8 through the dryer.

An example for transporting a photographic film through the dryer of the present invention will now be described. With reference to FIG. 8, a first example of transporting processed photographic film through dryer 16 in accordance with the present invention is shown. In FIG. 8, a last wash rack 600 of a processor is illustrated as an example. After passing through last wash rack 600, photographic film which includes a leader card 602 provided thereon in a conventional manner is transported from last wash rack 600 to dryer 16. As shown in FIG. 8, dryer 16 can include motor and chain driven sprockets 604 which are adapted to cooperate with a side end of leader card 602 in order to pull the photographic film into and through dryer 16. More specifically, as illustrated in FIG. 9, sprockets 604 include teeth 604*a* which are adapted to mesh with perforations or holes in leader card 602, so as to transport leader card 602 through dryer 16. As also shown in FIG. 9, dryer 16 preferably includes guide grooves 606 to help guide leader card 602 through dryer 16.

Figure 10:
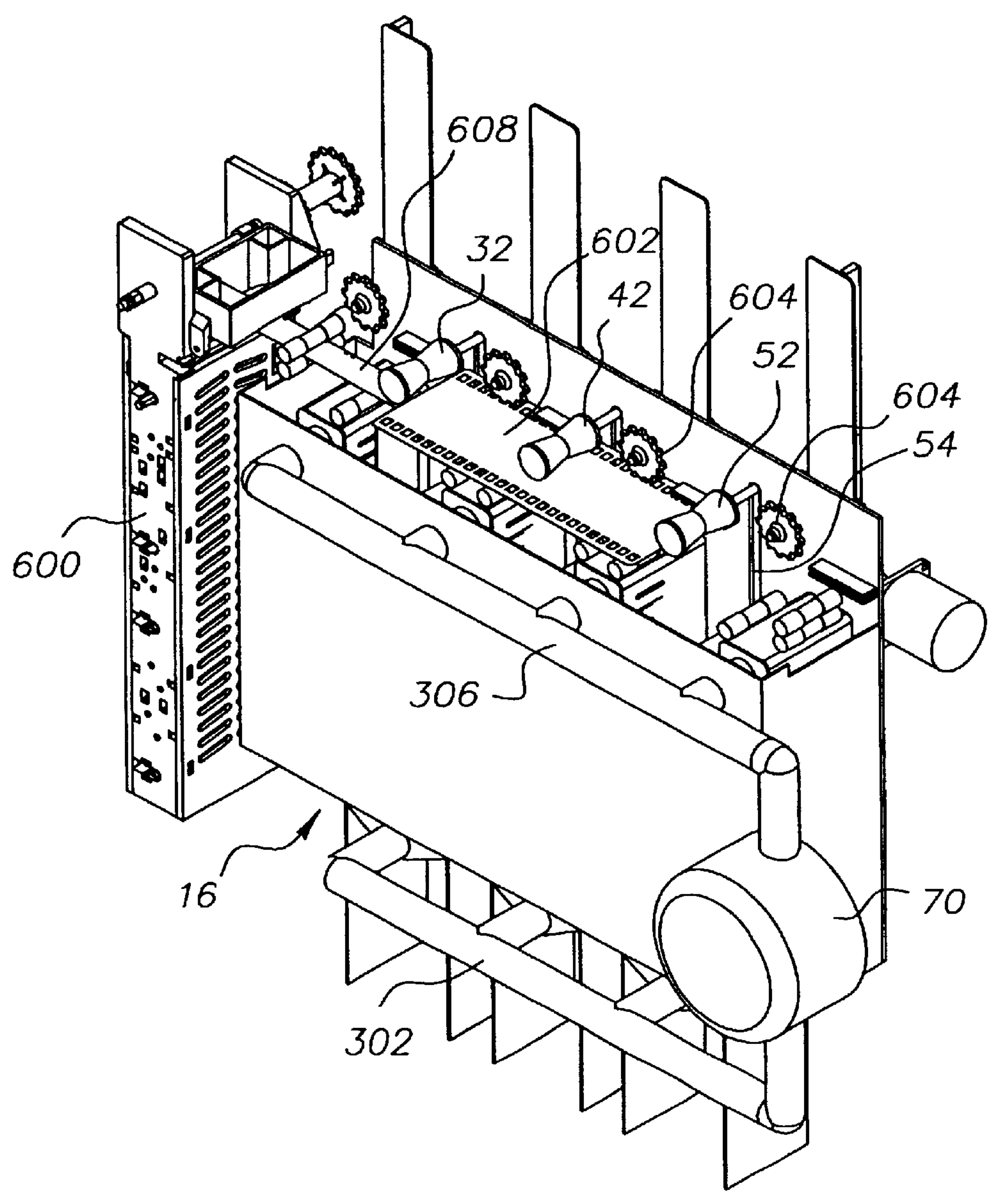
FIG. 10 illustrates the film and leader card of FIG. 8 being transferred through the dryer of the present invention.
Figure 11:
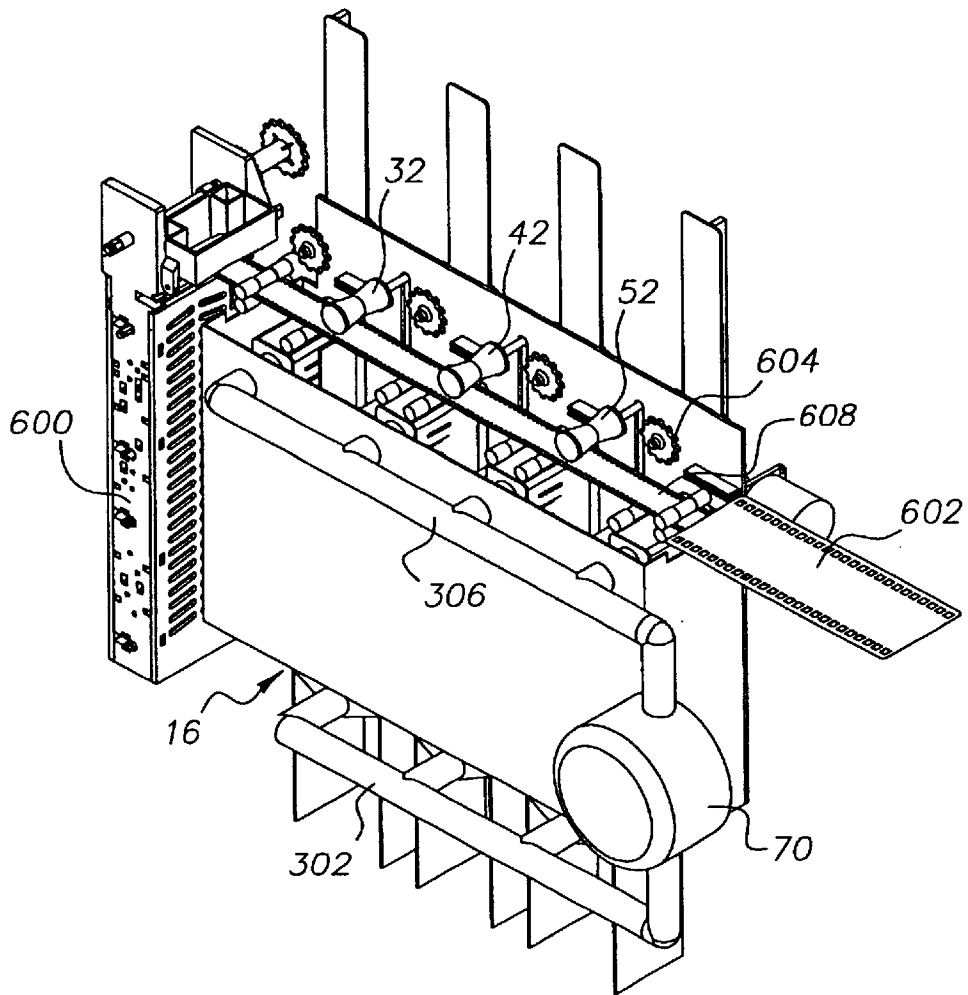
FIG. 11 is a view similar to FIG. 10 with the film being driven toward an outlet of the dryer.

FIG. 10 illustrates leader card 602 further along within dryer 16 and illustrates processed photographic film 608 attached to leader card 602 in a conventional manner. Photographic film 608 is shown leaving last wash tank 600, and is being driven or pulled into dryer 16 for the purpose of drying the photographic film. As leader card 602 is driven by way of sprockets 604, photographic film 608 is advanced into dryer 16 to the position illustrated in FIG. 11. When film 608 is conveyed to the position shown in FIG. 11, adjustable rollers 32, 42 and 52 are moved as described with reference to FIGS. 5B, 5C, 6B, 6C, to a desired position along respective slots 34, 44 and 54, in the manner as also described with reference to FIGS. 5A–5C and 6A–6C. That is, each of adjustable rollers 32, 42 and 52 are moved along their respective slots 34, 44 and 54, in accordance with the length of the film to be dried. At that point, sliding members 200, 202, 204 and 206 are adjusted as noted with respect to FIGS. 5A–5C and 6A–6C, so as to supply the appropriate amount of drying air to photographic film 608 in accordance with the size of the slack loop formed by film 608 as also described with respect to FIGS. 5A–5C and 6A–6C.

Figure 12:
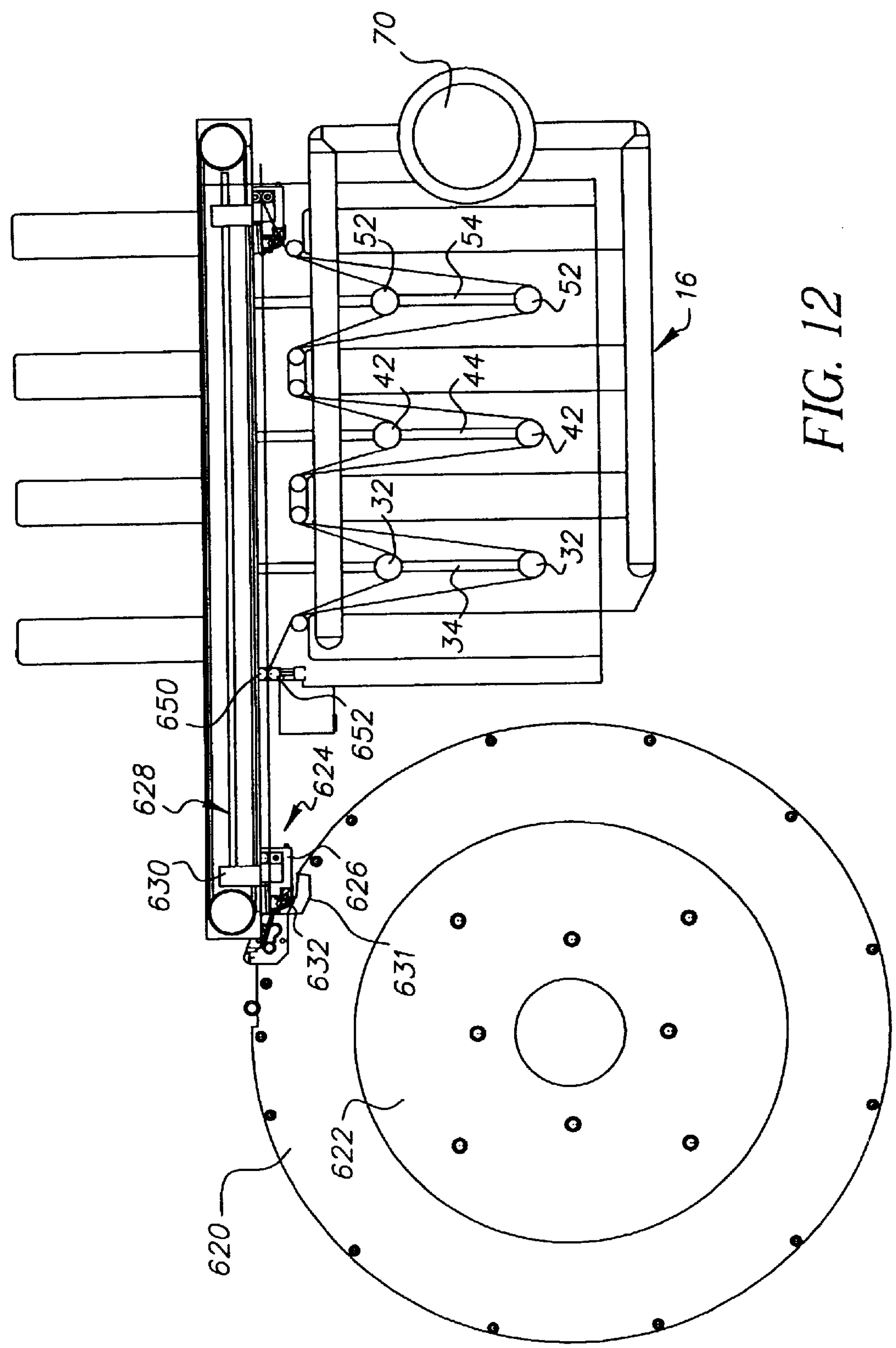
FIG. 12 is a view of a further embodiment of the dryer, wherein a transfer assembly, in accordance with the present invention, is used to transfer film and an associated cartridge from a drum-type processor to the dryer.

The above has been described with reference to a photographic processor which includes traditional tanks that contain processing solution and washing solution. In a further feature of the present invention, dryer 16 can be operationally associated with a circular drum-type processor as illustrated in FIG. 12. With reference to FIG. 12, a drum processor 620 and an associated circular disk 622 is shown. Drum processor 620 is similar to the drum processor described in U.S. Pat. No. 6,485,202, issued Nov. 26, 2002 and U.S. Pat. No. 6,485,204 issued Nov. 26, 2002; and U.S. application Ser. No. 10/027,432 filed Dec. 21, 2001 and Ser. No. 10/164,067 filed Jun. 5, 2002, the contents of which are herein incorporated by reference. The operation of the drum processor as disclosed in the above-mentioned co-pending and/or corresponding patents and/or applications is also incorporated herein by reference.

More specifically, drum processor 620 operates in a manner as described in the above-noted U.S. patent and applications, wherein a cartridge having a roll of exposed film is delivered to drum 620, and thereafter a disk 622 having teeth on an outer periphery thereof cooperates with sprocket holes on the film to transport the film to a processing area in a lower portion within drum 620. That is, and with reference to APS film, a cartridge 632 having exposed film therein is placed on a surface 631 of drum 620. Thereafter, a drive system as described in the above-mentioned U.S. patents and/or applications is actuated to drive the film from cartridge 632 into drum 620. Once the film is within drum 620, disk 622 having disk teeth on an outer periphery thereof, as also described in the above-mentioned patents and/or applications, is activated so that the disk teeth are inserted into the sprocket holes of the film and the disk is thereafter rotated to pull the film from the cartridge and into the drum 620 for processing. Once the film is within drum 620, a processing solution delivery system as also described into above-mentioned U.S. patents and/or applications cooperates with drum 620 so as to delivery processing solution to a processing section at a lower portion of drum 620. Thereafter, the drum is rotated as described in the above-mentioned patents and/or applications to process the film. After processing within drum 620, in a manner as also described in the above-referenced patents and/or patent applications, the cartridge with the film trailing therefrom can be removed and supplied to a dryer.

Figure 13:
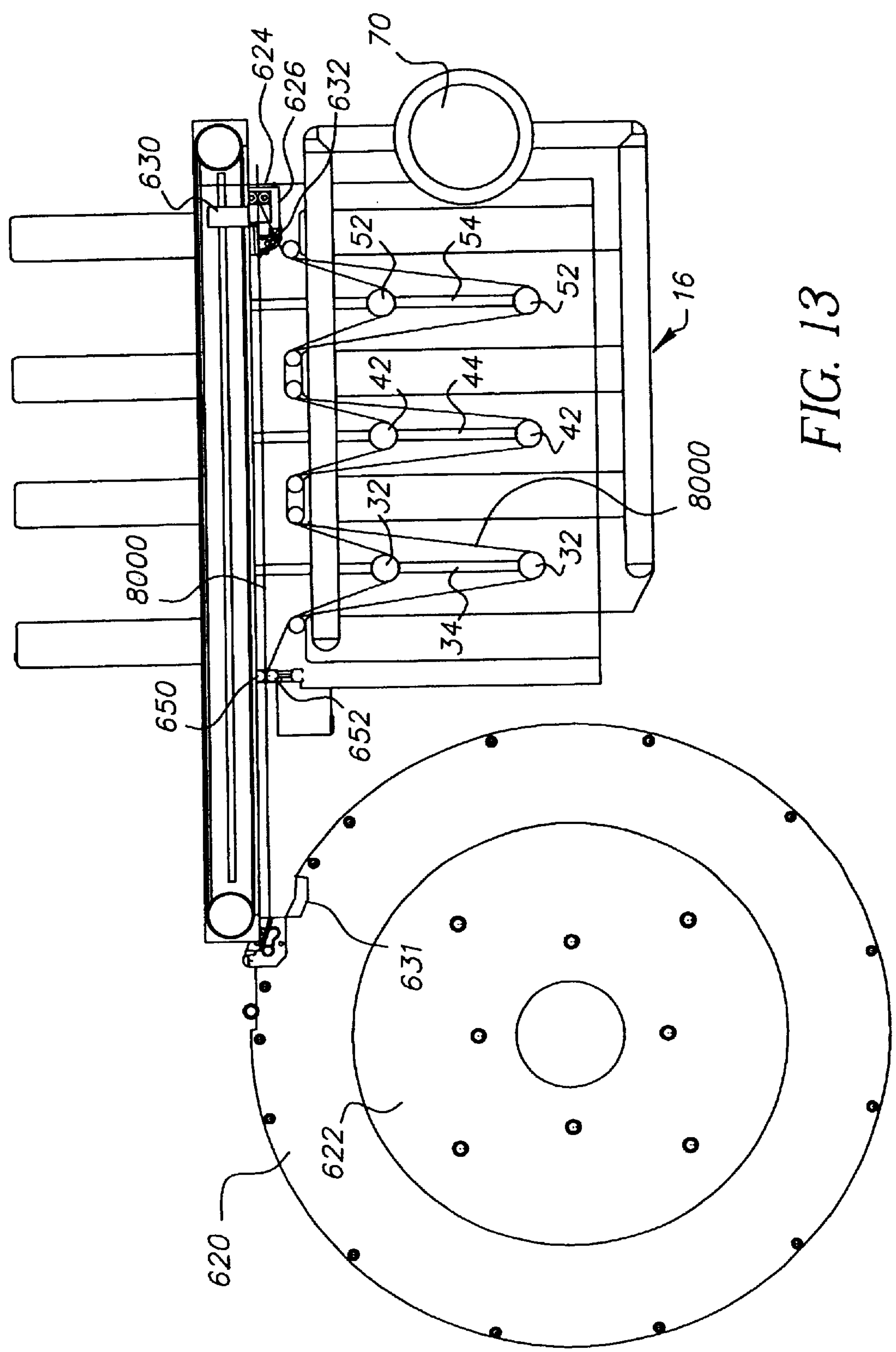
FIG. 13 is a view similar to FIG. 12 with the cartridge being located within the dryer.

With respect to the dryer of the present invention, and with reference to APS-type film, the transfer of the film from the processor to the dryer utilizes a transfer assembly 624 as illustrated in FIG. 12. More specifically, transfer assembly 624 includes a support member 626 as well as a transporting or driving mechanism 628. For the purposes of transferring the APS cartridge and the film trailing therefrom from drum processor 620 to dryer 16, transfer assembly 624 is placed in the position shown in FIG. 12. Support member 626 includes a holding arrangement, a grabbing mechanism or a snap member the details of which will be described later, which grabs cartridge 632 positioned on surface 631 of drum processor 620. Transfer assembly 624 as noted above further includes a driving mechanism 628 which can be a lead screw and/or a drive belt. The lead screw or drive belt is drivingly associated with a plate member 630 which is attached to or integral with support member 626. Movement of the lead screw or drive belt provides for the movement of plate member 630 from the position illustrated in FIG. 12 to the position illustrated in FIG. 13. This places cartridge 632 (held by support member 626) in a vicinity of an outlet of dryer 16, while a film 8000 trailing therefrom spans across the top end of dryer 16. At that point, adjustable rollers 32, 42 and 52 are positioned above film 8000 spanning across to top end of dryer 16. Adjustable rollers 32, 42 and 52 can then be moved along respective slots 34, 44 and 54, depending upon the length of the photographic film, to any of a variety of positions as shown in FIGS. 12 and 13. For example, for shorter length film, rollers 32, 42 and 52 can be placed in a middle position within slots 34, 44 and 54 as shown in FIG. 13. For longer length film, adjustable rollers 32, 42 and 52 can be moved toward the bottom of slots 34, 44 and 54 as also shown in FIG. 13. Thereafter, the sliding mechanisms can be controlled as previously described to open up the appropriate slots and dry the film. Although a lead screw or drive belt is shown with regard to transfer assembly 624, the present invention is not limited thereto. It is recognized that any type of arrangement which achieves a linear motion, such as a chain drive, a gear train or a rack gear can be used to drive the transfer assembly.

Figure 14A:
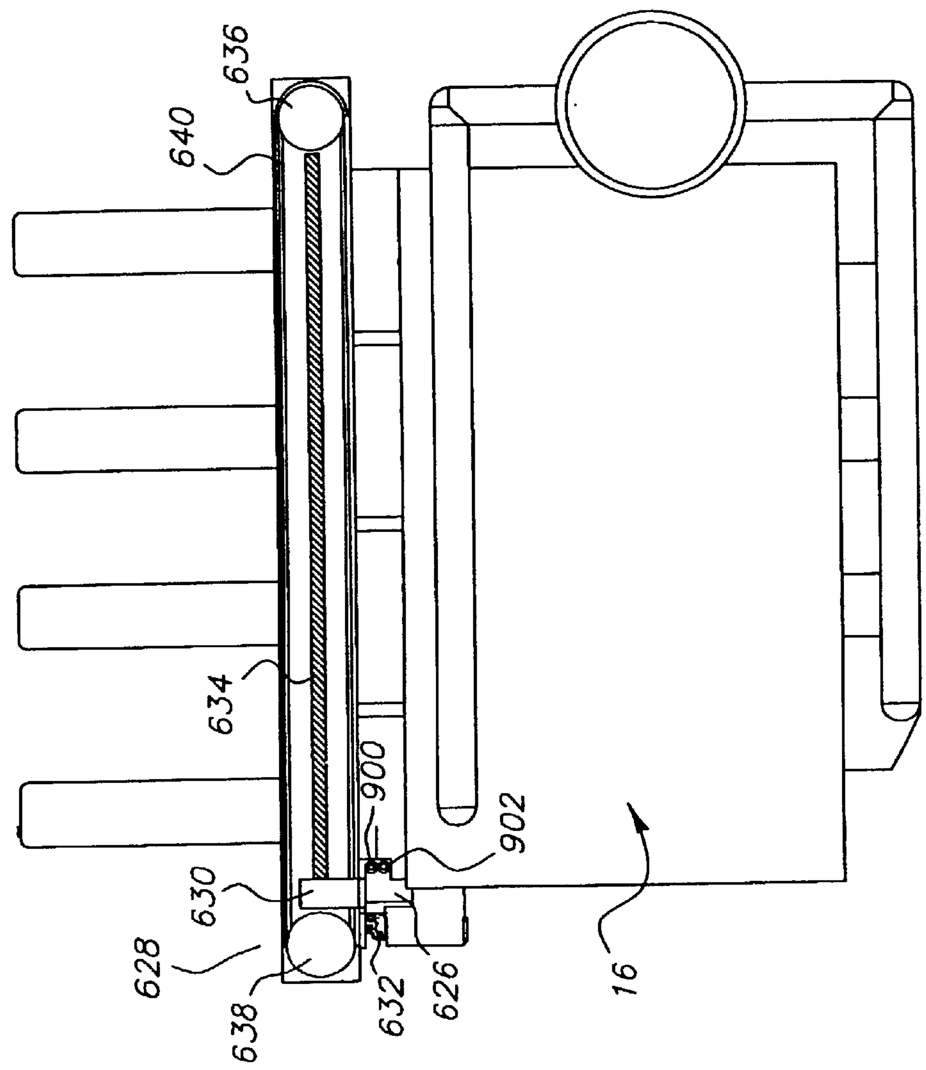
FIG. 14A is a view of a transporting or driving mechanism for the transfer assembly of the dryer of the present invention.
Figure 14B:
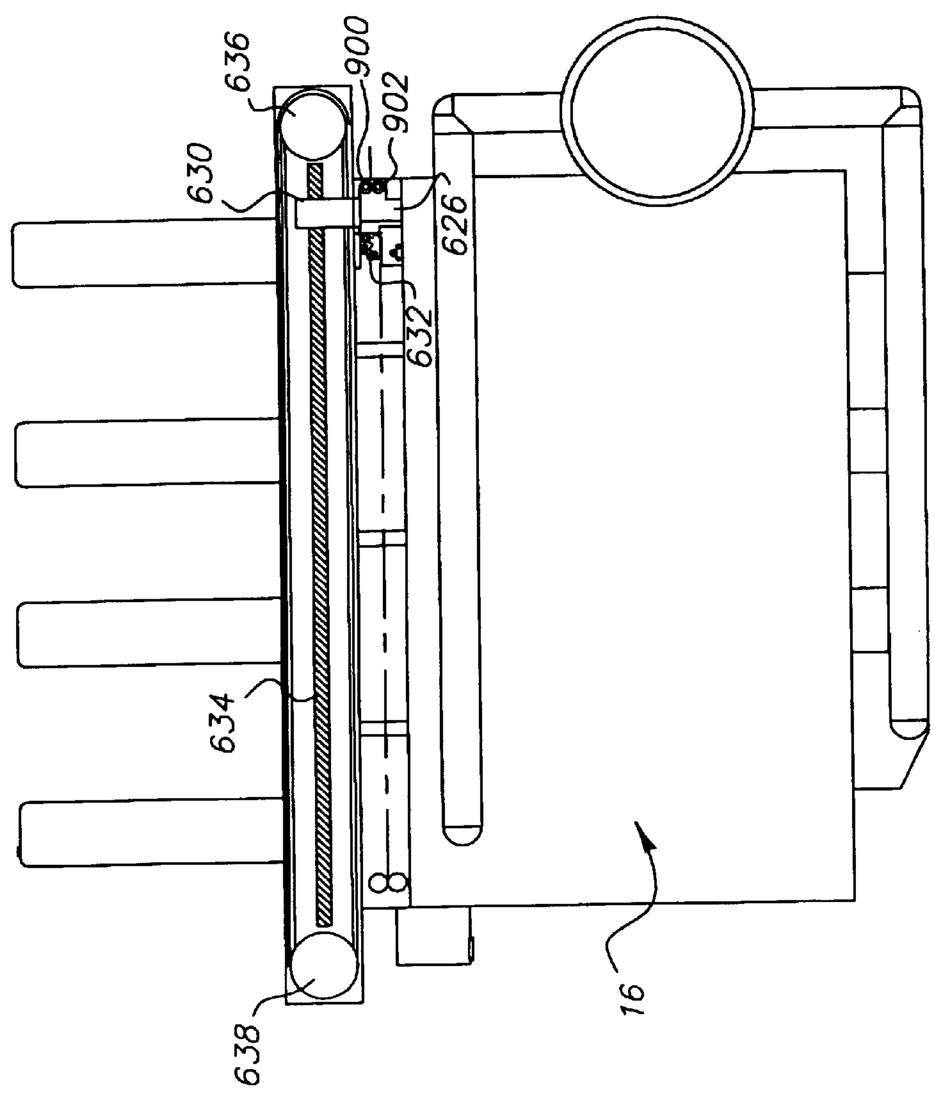
FIG. 14B is a view similar to FIG. 14A, wherein the transfer assembly has been conveyed to an area in a vicinity of an outlet of the dryer.

FIGS. 14A–14B illustrate features of the transfer assembly, support member and driving mechanism of the present invention with reference to APS film. In the example of FIG. 14A, plate member 630 is shown in the vicinity of an entrance to dryer 16, and support member 626 is shown holding APS cartridge 632. In one embodiment, plate member 630 can be rotatably positioned on a lead screw 634 such that rotation of lead screw 634 causes a movement of plate member 630 and a corresponding movement of support member 626 in an axial direction along the top dryer of 16. Depending on the rotation direction of a motor that drives lead screw 634, support member 626 can be driven back and forth between an entrance (FIG. 14A) and an exit (FIG. 14B) of dryer 16 as shown in FIG. 14B.

As a further option for moving plate member 630 and therefore, support member 626, plate member 630 can be attached to a endless conveyer belt 640 which is wrapped around rollers 636 and 638. Rotation of at least one of rollers 636, 638 causes a corresponding movement of conveyer belt 640 and therefore, a corresponding movement of plate 630 between at least the positions shown in FIGS. 14A and 14B.

Figure 15:
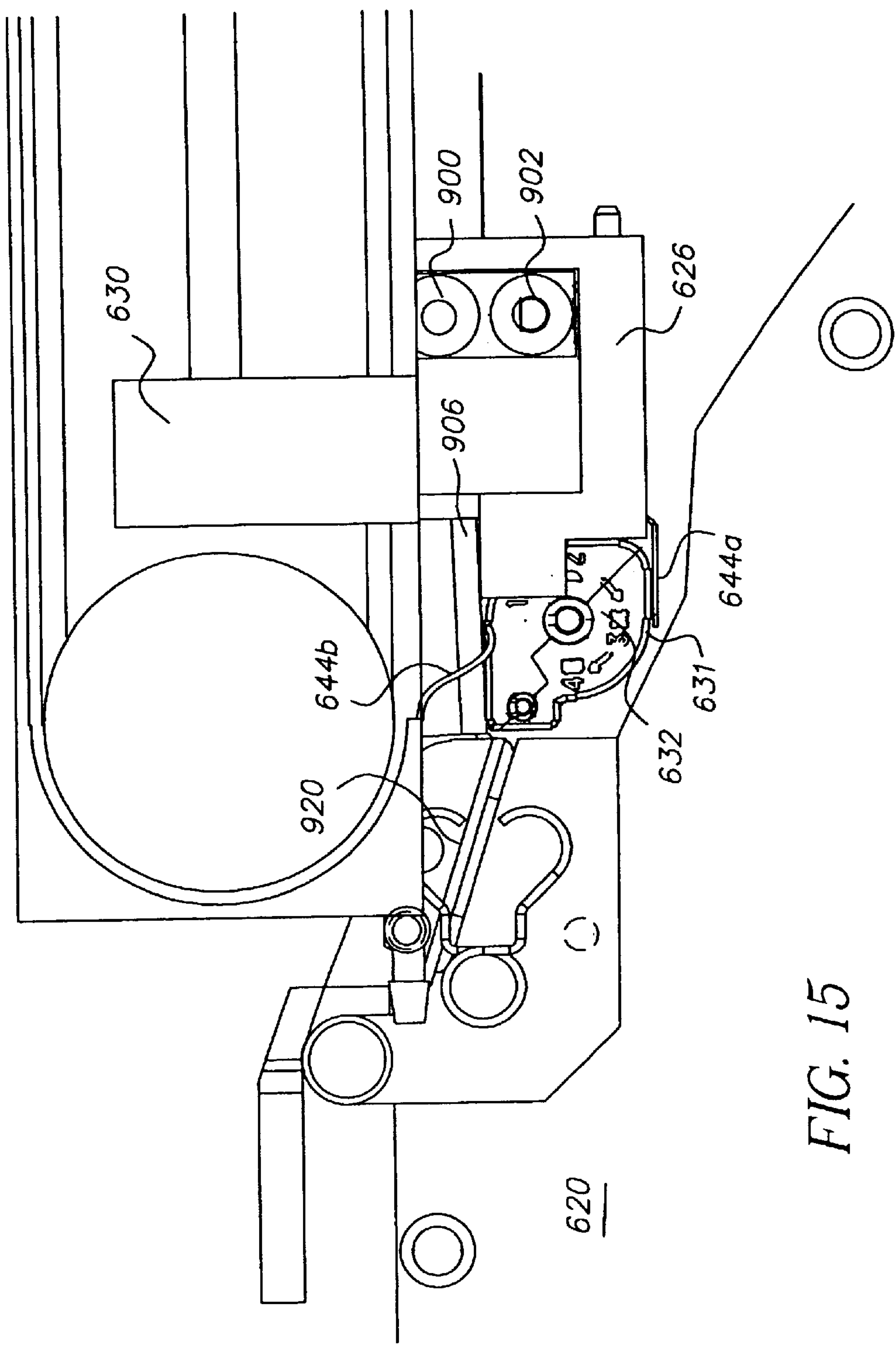
FIG. 15 is a view of the transfer assembly of the present invention.

FIG. 15 illustrates a more detailed view of support member 626. As shown in FIG. 15, a feature of drum 620 is that during processing, cartridge 632 is placed on a surface 631 of drum 620. For processing, through use of driving rollers, the film is drawn out from APS cartridge 632 and positioned within drum 620 in the manner as described in the above-mentioned patents and/or applications. After processing is complete, support member 626 is moved towards cartridge 632 to a position in which a holding arrangement or grabbing mechanism such as metal snaps 644*a* and 644*b* of support member 626 snaps onto cartridge 632. When support member 626 and snap members 644*a*, 644*b* snap onto cartridge 632, driving mechanism 628 is actuated to pull cartridge 632 and the film trailing therefrom from processing drum 620 and into dryer 16.

Figure 16B:
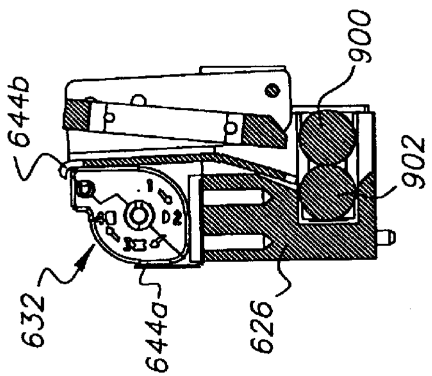
FIGS. 16A–16C are isolated views of a portion of the transfer assembly with an APS cartridge held thereon.
Figure 16C:
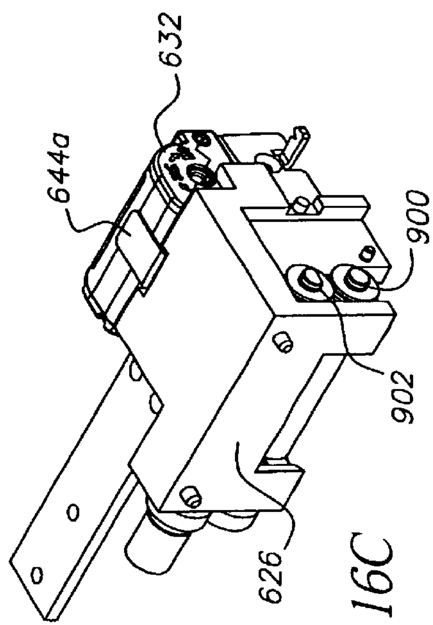
Figure 16A:
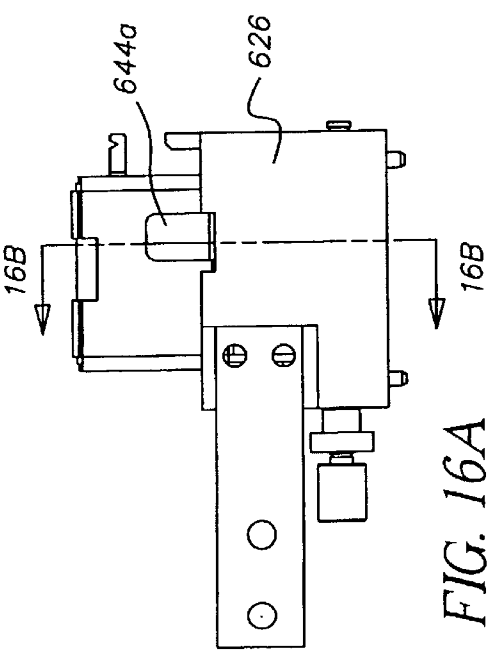

FIGS. 16A–16C illustrate further views of support member 626 of the present invention, wherein the support member is shown holding APS cartridge 632. FIG. 16A is a view of the bottom of support member 626 while FIG. 16B is a side view of support member 626 showing snap members 644*a*, 644*b* on either side of cartridge 632. In the view of FIG. 16C which is a perspective bottom view, bottom snap member 644*a* is shown around APS film cartridge 632.

Figure 17:
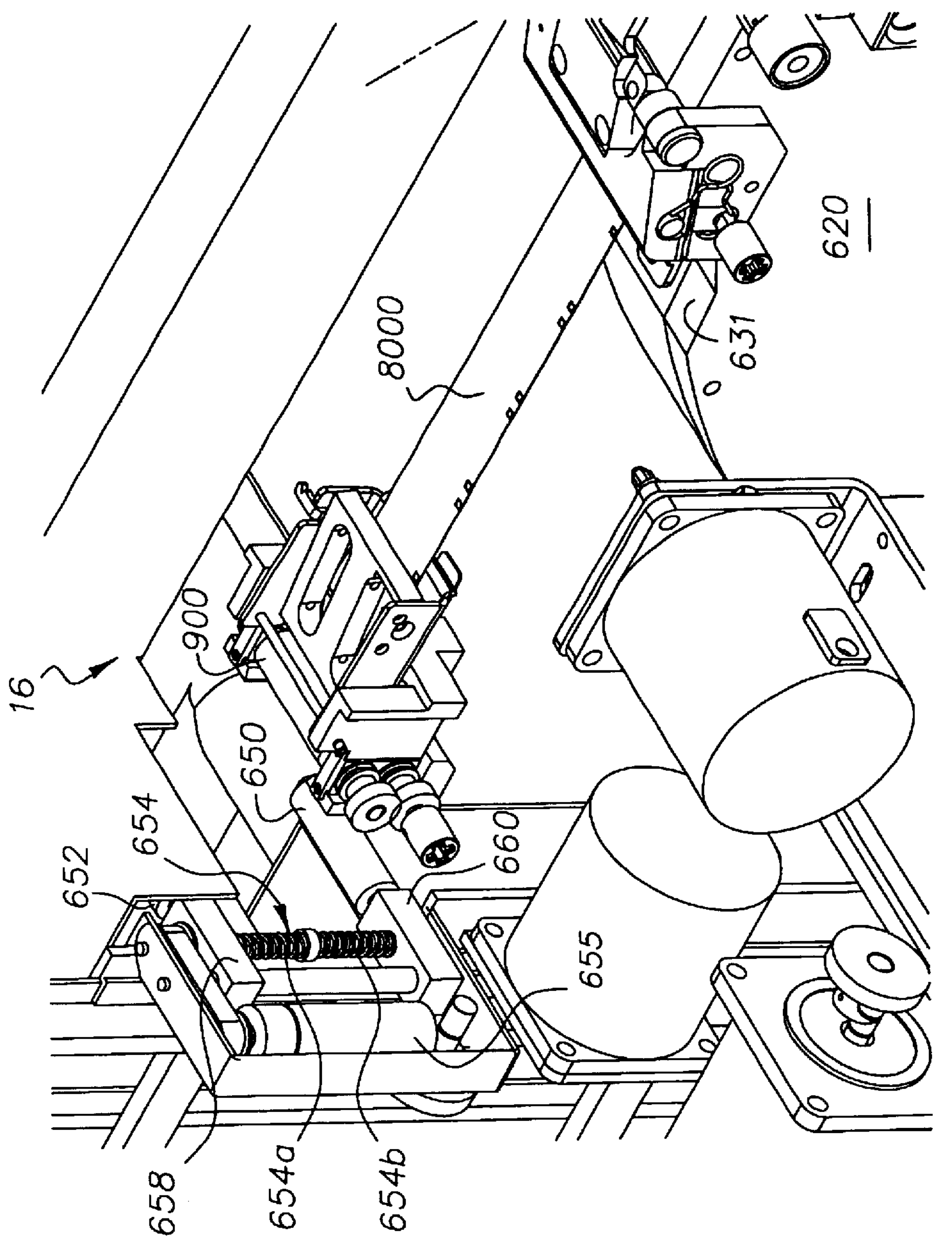
FIGS. 17–18 are views which detail the transfer of an APS cartridge form a drum-type processor to the dryer.

With reference to FIG. 17, a position after support member 626 and snap members 644*a*, 644*b* grabs APS cartridge 632 is shown. That is, in the view of FIG. 17, support member 626 has grabbed APS cartridge 632 as shown in FIG. 15, and pulls APS cartridge 632 (through the use of driving mechanism 628) towards the entrance of dryer 16. In the view of FIG. 17, processed film 8000 attached to cartridge 632 is seen as it is coming out of processing drum 620. In a feature of the invention, dryer 16 includes opposing pinch rollers 652 and 650. Pinch roller 652 is attached to a first plate member 658 which is rotatably provided on a lead screw arrangement 654. Lead screw arrangement 654 includes a first section 654*a* having threads which are inclined in a first direction, and a second section 654*b* having threads which are inclined in a second direction which is opposite to the first direction. First plate member 658 attached to roller 652 is specifically threaded on first section 654*a*, while a second plate member 660 is attached to roller 650 and is threadedly provided on second section 654*b*.

Therefore, rotation of lead screw arrangement 654 in a first direction by, for example, a motor 655, causes rollers 650 and 652 to move toward each other, while rotation of lead screw arrangement 654 in a second direction causes rollers 652 and 650 to move away from each other. With this arrangement, when support member 626 is moved toward the entrance of dryer 16, pinch rollers 650 and 652 are controlled so as to be placed in an open position as illustrated in FIG. 17. This permits support member 626 which is being transported by driving mechanism 628 to be inserted into the entrance of dryer 16 and accordingly, permits the movement of support member 626 and the film trailing therefrom to the position illustrated in FIG. 13.

Figure 18:
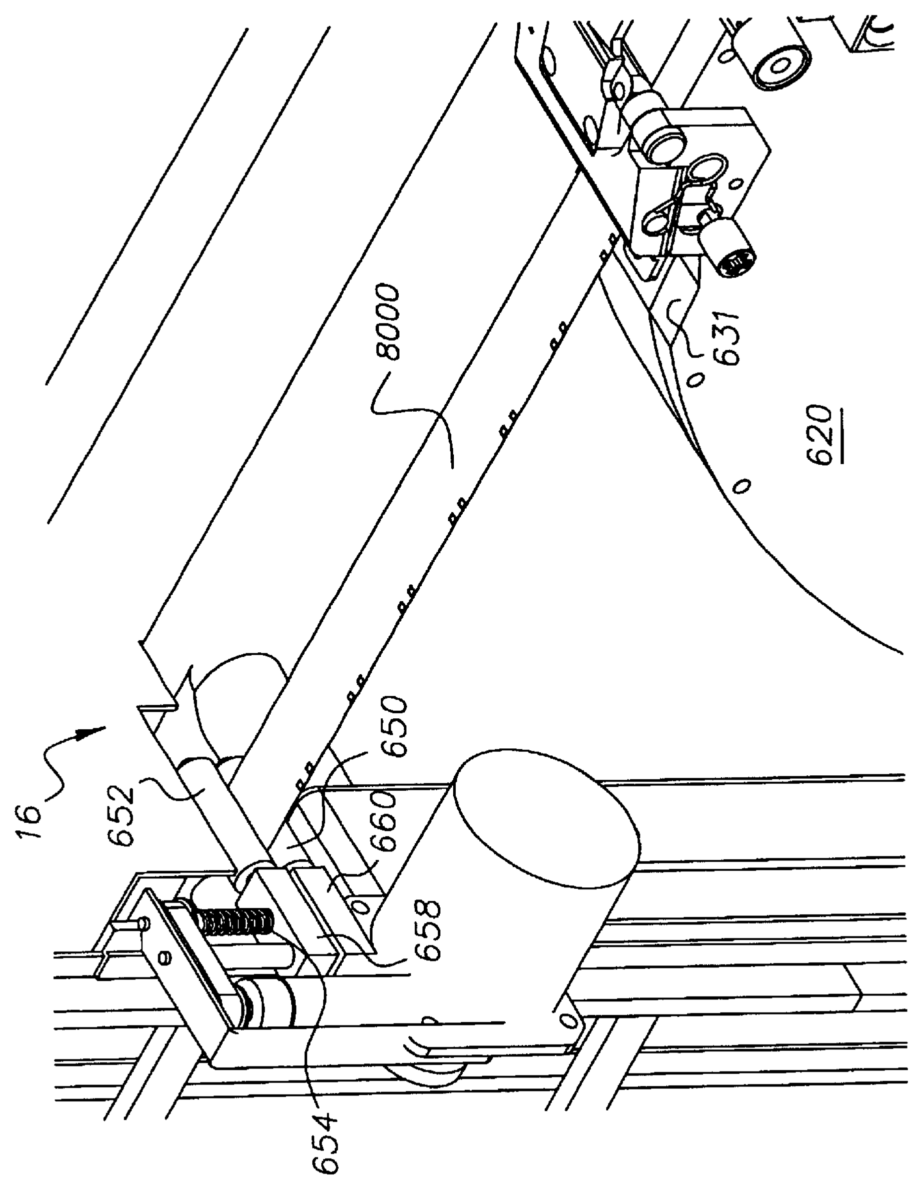
Figure 19B:
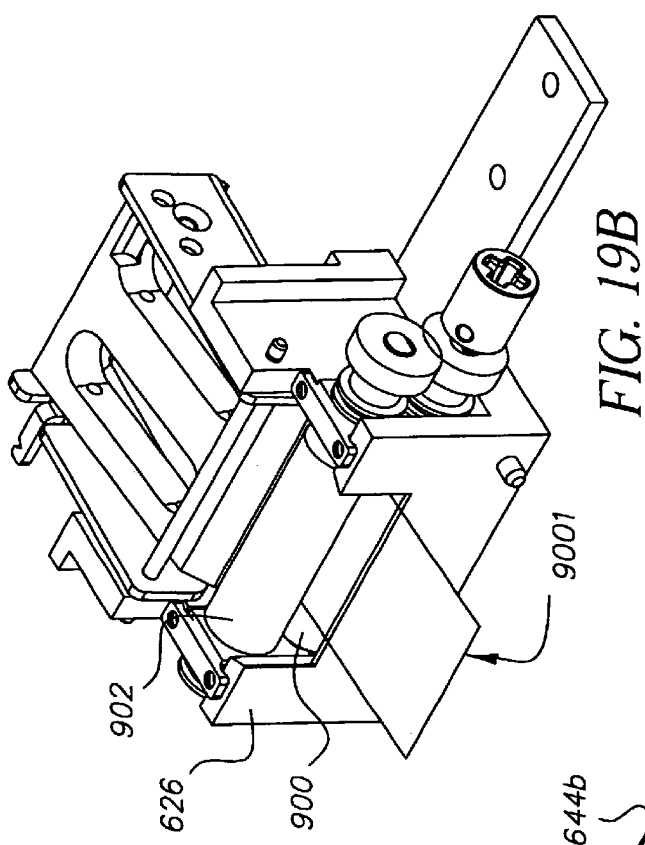
FIGS. 19A–19B are isolated views of a portion of the transfer assembly wherein 35 mm film is being transferred.
Figure 19A:
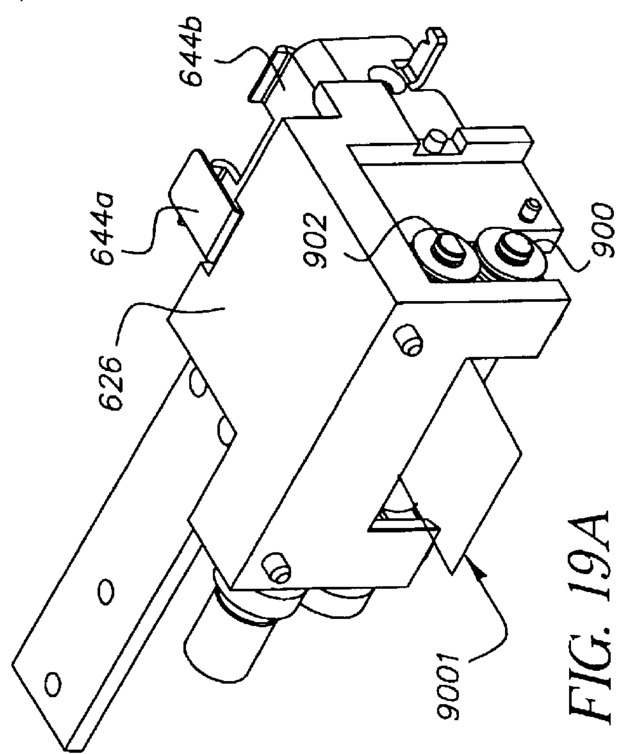
Figure 22:
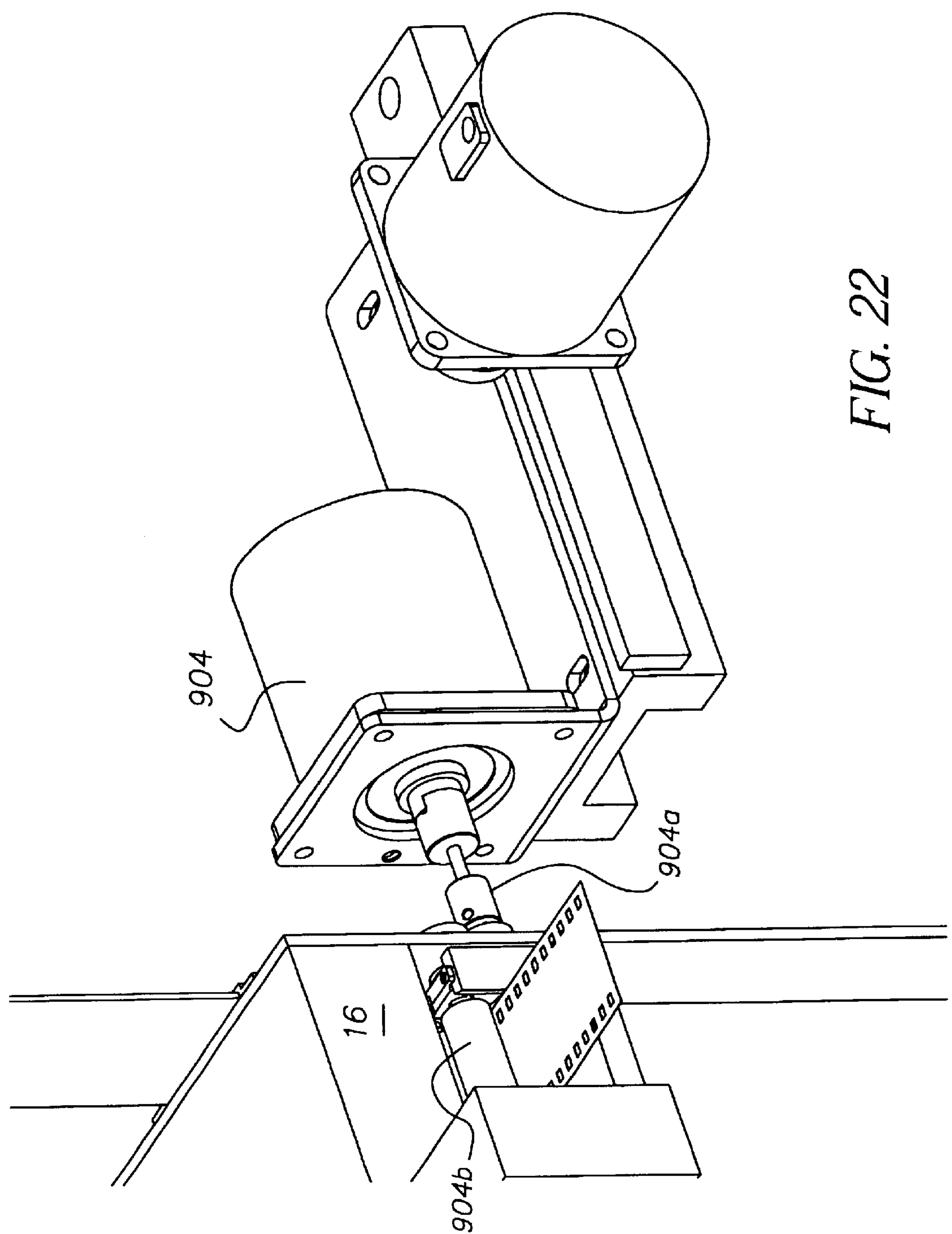
FIG. 22 illustrates a driving arrangement which can be used to drive dried 35 mm film from the dryer or wind dried APS film into a cartridge.

When support member 626 reaches the position illustrated in FIG. 13, pinch rollers 650 and 652 are controlled to move toward each other and therefore, pinch the end of photographic film 8000. FIG. 18 shows rollers 650 and 652 pinching against film 8000. With regard to the view of FIG. 18, in order to commence a drying operation support member 626 is driven until the end of film 8000 is located and held between pinch rollers 650 and 652. With this arrangement, the photographic film will be held on one side by pinch rollers 650 and 652, while the other side is supported by support member 626 which holds cartridge 632. As described with reference to FIG. 13, rollers 32, 42, 52 can then be moved to form slack loops in the film. Upon completion of the drying of the photographic film within the dryer, a driving arrangement 904 such as illustrated in FIG. 22 can be inserted within the APS cartridge so as to wind the dried film within the cartridge, and prepare the film for removal the dryer. More specifically, driving arrangement 904 can be a motor attached to a shaft 904*a*. Shaft 904*a* can be adapted to be inserted into cartridge 632 for the purpose of winding the dried film back into the cartridge.

FIGS. 19A, 19B and 20–21 illustrate features of the present invention with respect to processing a second type of film such as 35 mm film 9001. For drying 35 mm film, it is noted that support member 626 includes a pair of pinch rollers 900 and 902 (FIGS. 19A–19B) supported thereon. Rollers 900 and 902 can also be seen in FIG. 13. Therefore, when 35 mm film is processed within processing drum 620 as described with reference to, for example, the above-mentioned U.S. applications or patents, the 35 mm film can be transferred from processing drum 620 to dryer 16 by driving the film out of processing drum 620 and to a path 920 as shown in FIG. 15 so as to enter a path 906 within support member 626 as also shown in FIG. 15.

Figure 20:
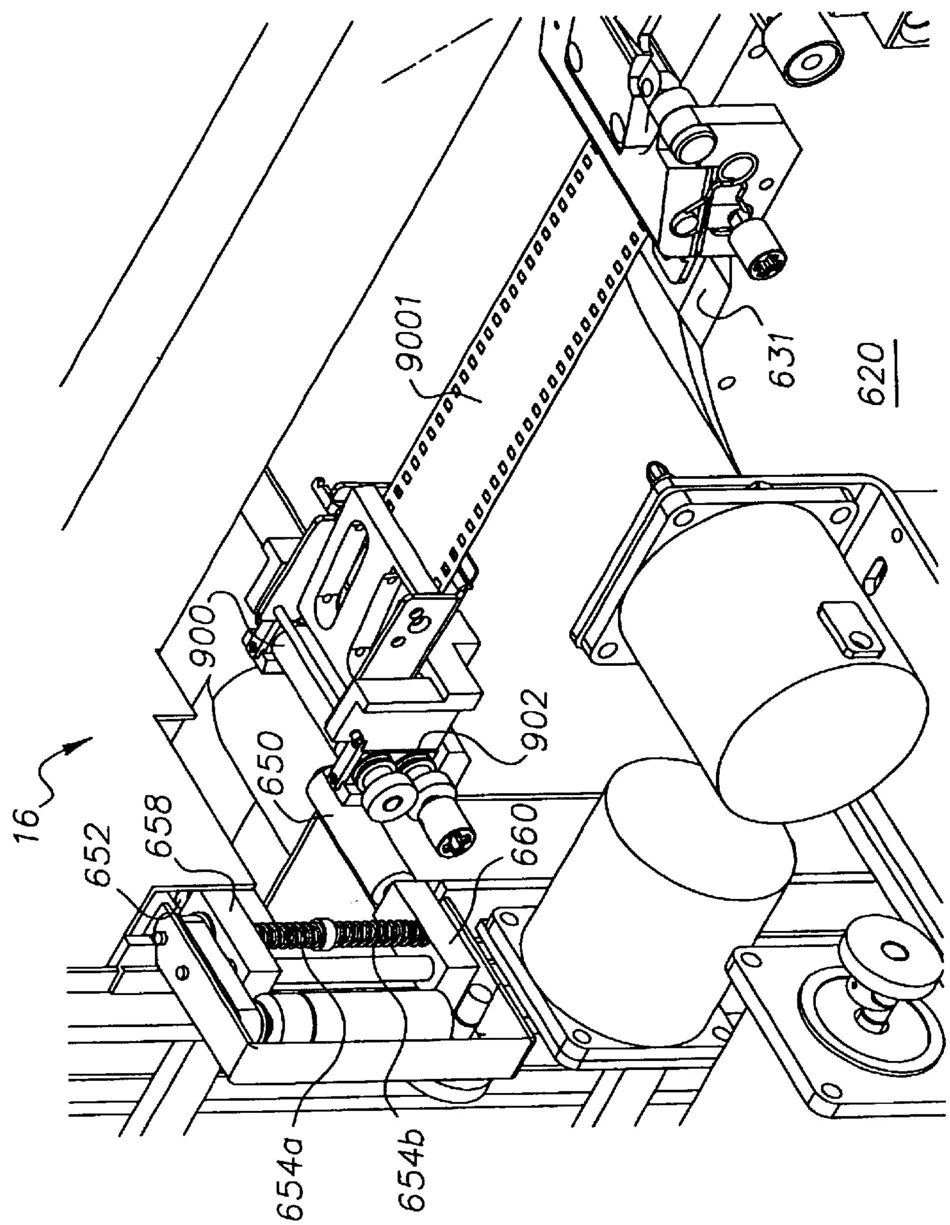
FIGS. 20–21 are views which detail the transfer of 35 mm film from a drum-type processor to the dryer.
Figure 21:
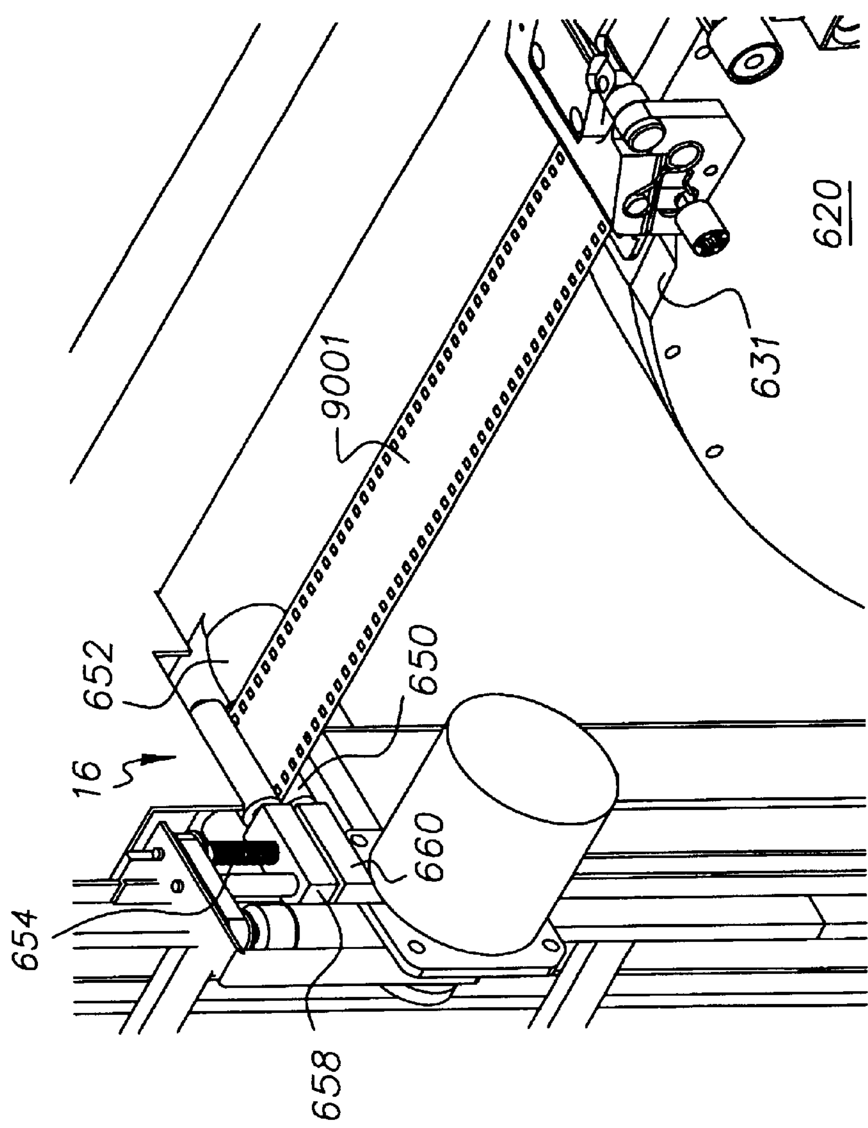

Once within path 906, 35 mm film is driven between rollers 900 and 902 with the front end of the 35 mm film being held therebetween. It is noted that rollers 900 and 902 are preferably spring-loaded rollers which are spring loaded in a direction towards each other. Thereafter, driving mechanism 628 can be operated to begin moving support member 626 towards the entrance of dryer 16 as shown in FIG. 20 and also to begin pulling processed film 9001 from processing drum 620. It is noted that with 35 mm film, snap members 944*a* and 944*b* are not used. As support member 626 is conveyed into dryer 16, movable pinch rollers 650, 652 are operated so as to be in the open position as shown in FIG. 20, so as to permit the passage of support member 626 therebetween. Thereafter, support member 626 is conveyed toward a vicinity of the exit of dryer 16 while 35 mm film 9001 is pulled from processing drum 620 so as to reach a position analogous to the position illustrated in, for example, FIG. 13 (i.e. a position in the vicinity of an exit from dryer 16). At that point, pinch rollers 650, 652 pinch against the other end of photographic film 9001. FIG. 21 shows pinch rollers 650,652 pinching film 9001. With regard to the view of FIG. 21, in order to commence a drying operation, support member 626 is driven to place an end of film 9001 between rollers 650, 652. With this arrangement, a first end of film 9001 is held between rollers 900, 902, and a second end of film 9001 is held between rollers 650, 652. Adjustable rollers 32, 42, 52 are then moved along their elongated slots in a manner similar to the manner described with respect to APS film so as to create slack loops. At that point, the film can be dried in a manner similar to the manner as previously described. Furthermore, for the purposes of driving the dried film out of dryer 16, driving arrangement 904 (FIG. 22) and shaft 904*a* located in a vicinity of an outlet of dryer 16 can be actuated to rotate a set of exit pinch rollers 904*b*, and therefore, drive the photographic film to downstaeam equipment such as, for example, a scanner.

Accordingly, the present invention provides for an improved dryer where slack loops are adjustable in accordance with the length of the film. The dryer of the present invention is adapted to receive processed film from a tank type processing arrangement wherein the photographic film with a leader card attached thereon is conveyed into the dryer. In addition, the dryer of the present invention can also receive processed photographic film from a drun-type processing arrangement as described. With respect to the drum-type processing arrangement, the present invention provides for a unique transfer assembly for transferring film attached to a cartridge such as APS film or the film itself such as 35 mm film from the drum processor to the dryer. Further, although APS and 35 mm film are discussed, the present invention is not limited thereto. The present invention is applicable for drying multiple types of film in addition to 35 mm and APS film.

Therefore, the present invention provides for a dryer which permits the drying of photographic media while the media is moving. The dryer of the present invention also permits the removal of the media from a processor so as to improve throughput. The use of the telescoping sliding members as described permits the adjustment of the dryer lengths and the air output. This permits the use of the proper amount of air for drying the media and assists in directing air onto the media. Further the adjustable rollers permit the adjustment of the size of the slack loops in the dryer in accordance with the length of the media being dried.

The invention has been described in detail with particular reference to certain preferred embodiments thereof, but it will be understood that variations and modifications can be effected within the spirit and scope of the invention.

What is claimed is:

1. A dryer for photographic material, the dryer comprising:

a path for photographic material which extends from an entrance to an exit of the dryer, wherein at least one slack loop is provided in said photographic material;

an adjustable roller provided along said path and at said slack loop in said photographic material, a position of said adjustable roller being adjustable to change a size of said slack loop;

a frame member having a wall which faces said slack loop, said wall comprising a plurality of slots which are provided in a spaced manner along said wall;

an air supply arrangement adapted to supply air into said frame member, said air passing through said slots in a direction toward said slack loop of the photographic material; and a sliding telescoping member slidable within said frame member to open and close said slots, wherein said sliding telescoping member is movable based on the size of the slack loop as set by the adjustable roller to open slots of said plurality of slots which face the slack loop and close slots of said plurality of slots which do not face the slack loop.

2. A dryer according to claim 1, wherein said air supply arrangement comprises an air blower.

3. A dryer according to claim 1, wherein said photographic material is photographic film or paper.

4. A dryer according to claim 1, further comprising an air reciculation system for recirculating air to said air supply arrangement, said air recirculation system comprising an air inlet located below said slack loop.

5. A dryer for photographic material, the dryer comprising:

a path for photographic material which extends from an entrance to an exit of the dryer;

a first roller and a second roller provided along said path for transporting the photographic material to be dried along said path, said second roller being provided downstream of said first roller with respect to a direction of travel of said photographic material along said path;

a first adjustable roller provided in a first slack loop area along said path between said first roller and said second roller, such that said photographic material in said path passes around said first adjustable roller to form a first slack loop between said first and second rollers, a position of said first adjustable roller being adjustable to change a size of said first slack loop;

a frame member having a first wall which faces said first slack loop area, said first wall comprising a plurality of first slots which are provided in a spaced manner along said first wall;

an air supply arrangement adapted to supply heated air into said frame member, said air passing through said first slots in a direction toward said first slack loop area to dry the photographic material; and a sliding member slidable within said frame member to open and close said first slots, wherein said sliding member is movable based on the size of the first slack loop as set by the first adjustable roller to open first slots of said plurality of first slots which face the first slack loop and close first slots of said plurality of first slots which do not face the first slack loop.

6. A dryer according to claim 5, further comprising:

a third roller and a fourth roller provided along said path for transporting the photographic material to be dried along said path, said fourth roller being provided downstream of said third roller with respect to the direction of travel of said photographic material along said path, said third roller and said second roller being provided above a top surface of said frame member; and a second adjustable roller provided in a second slack loop area along said path between said third roller and said fourth roller, such that said photographic material in said path further passes around said second adjustable roller to form a second slack loop between said third and fourth rollers, a position of said second adjustable roller being adjustable to change a size of said second slack loop;

wherein:

said frame member includes a second wall which faces said second slack loop area, said second wall comprising a plurality of second slots which are provided in a spaced manner along said second wall;

said air supplied into said frame member by said air supply arrangement further passes through said second slots in a direction toward said second slack loop area to dry the photographic material; and said sliding member is further adapted to open said second slots when said first slots are opened and close said second slots when said first slots are closed, said sliding member being movable based on the size of the first slack loop and the second slack loop as respectively set by the first and second adjustable rollers to open first slots of said plurality of first slots which face the first slack loop and second slots of said plurality of second slots which face the second slack loop, and close first slots of said plurality of first slots which do not face the first slack loop and second slots of said plurality of second slots which do not face the second slack loop.

7. A dryer according to claim 5, further comprising a plurality of said frame members, a plurality of said sliding members associated with said frame members, and a plurality of said adjustable rollers positioned along said path.

8. A dryer according to claim 5, further comprising an air recirculation arrangement which comprises an air inlet located in said first slack loop area for receiving said supplied air and returning the air to said air supply arrangement.

9. A dryer for drying photographic material, the dryer comprising:

at least one first conveying roller for conveying photographic material from an entrance to said dryer to a first slack loop area;

a first adjustable roller around which said photographic material passes to form a first slack loop of said photographic material, said first adjustable roller being located in said first slack loop area and being adjustable to adjust a size of said first slack loop;

a first set of slots located in an area below said at least one first conveying roller for directing drying air in a direction toward a first side of said first slack loop;

at least one second conveying roller downstream of said first adjustable roller with respect to said direction of travel of said photographic material, said at least one second conveying roller conveying said photographic material to a second slack loop area; and a second set of slots located in an area below said at least one second conveying roller for directing drying air in a direction toward a second side of said first slack loop.

10. A dryer according to claim 9, further comprising:

a second adjustable roller around which said photographic material passes to form a second slack loop of said photographic material, said second adjustable roller being located in said second slack loop area and being adjustable to adjust a size of said second slack loop;

a third set of slots located in said area below said at least one second conveying roller for directing drying air in a direction toward a first side of said second slack loop;

at least one third conveying roller downstream of said second adjustable roller with respect to said direction of travel of said photographic material, said at least one third conveying roller conveying said photographic material to a third slack loop area; and a fourth set of slots located in an area below said at least one third conveying roller for directing drying air in a direction toward a second side of said second slack loop.

11. A dryer according to claim 10, further comprising:

a third adjustable roller around which said photographic material passes to form a third slack loop of said photographic material, said third adjustable roller being located in said third slack loop area and being adjustable to adjust a size of said third slack loop;

a fifth set of slots located in said area below said at least one third conveying roller for directing drying air in a direction toward a first side of said third slack loop;

at least one fourth conveying roller downstream of said third adjustable roller with respect to said direction of travel of said photographic material, said at least one fourth conveying roller conveying said photographic material to an exit of said dryer; and a sixth set of slots located in an area below said at least one fourth conveying roller for directing drying air in a direction toward a second side of said third slack loop.

12. A dryer according to claim 9, further comprising a first sliding member for opening and closing said first set of slots.

13. A dryer according to claim 10, further comprising a second sliding member for opening and closing said second and third sets of slots.

14. A dryer according to claim 11, further comprising a third sliding member for opening and closing said fourth and fifth sets of slots.

15. A dryer according to claim 11, further comprising a fourth sliding mechanism for opening and closing said sixth set of slots.

16. A dryer for drying photographic material, the dryer comprising:

conveying means for conveying photographic material through the dryer, said conveying means comprising means for forming at least one slack loop in the photographic material;

first adjusting means for adjusting a size of the at least one slack loop in the photographic material;

drying means for blowing drying air toward the at least one slack loop to dry the photographic material; and second adjusting means for adjusting an amount of drying air supplied by said drying means to substantially match the size of the slack loop.

17. A dryer according to claim 16, further comprising recirculating means for recirculating drying air back to said drying means.

18. A processing assembly comprising:

a processor for processing photographic material; and a dryer for drying the processed photographic material;

the dryer comprising:

a path for photographic material which extends from an entrance to an exit of the dryer, wherein at least one slack loop is provided in said photographic material;

an adjustable roller provided at said slack loop in said photographic material, a position of said adjustable roller being adjustable to change a size of said slack loop;

a frame member having a wall which faces said slack loop, said wall comprising a plurality of slots which are provided in a spaced manner along said wall;

an air supply arrangement adapted to supply air into said frame member, said air passing through said slots in a direction toward said slack loop of the photographic material; and a sliding member slidable within said frame member to open and close said slots, wherein said sliding member is movable based on the size of the slack loop as set by the adjustable roller to open slots of said plurality of slots which face the slack loop and close slots of said plurality of slots which do not face the slack loop.

19. A method for drying photographic material, the method comprising the steps of:

inserting photographic material into a drying path of a dryer in a manner in which at least one slack loop is provided in said photographic material;

adjusting a size of said at least one slack loop in accordance with a length of the photographic material to be dried;

providing an area of spaced slots in a manner in which the slots face the at least one slack loop; and supplying drying air through spaced slots in said area of space slots which oppose the at least one slack loop while blocking spaced slots in said area of spaced slots which do not oppose the at least one slack loop, such that a distance covered by said spaced slots through which drying air is supplied substantially corresponds to the size of said slack loop.

20. A method according to claim 19, further comprising the step of recirculating the drying air back to said slots.

* * * * *